United States Patent
Eom et al.

(10) Patent No.: US 11,409,262 B2
(45) Date of Patent: Aug. 9, 2022

(54) COMPUTER AIDED GENERATIVE DESIGN WITH FILTERING TO FACILITATE 2.5-AXIS SUBTRACTIVE MANUFACTURING PROCESSES

(71) Applicant: Autodesk, Inc., San Rafael, CA (US)

(72) Inventors: Jaesung Eom, Wexford, PA (US); Ravi Kumar Burla, Novi, MI (US); Jesus Rodriguez, Farmington, MI (US); Benjamin McKittrick Weiss, Tualatin, OR (US); Nan Li, Mount Waverley (AU)

(73) Assignee: Autodesk, Inc., San Rafael, CA (US)

(*) Notice: Subject to any disclaimer, the term of this patent is extended or adjusted under 35 U.S.C. 154(b) by 262 days.

(21) Appl. No.: 16/877,286

(22) Filed: May 18, 2020

(65) Prior Publication Data

US 2021/0356939 A1 Nov. 18, 2021

(51) Int. Cl.
*G06F 30/20* (2020.01)
*G05B 19/414* (2006.01)
(Continued)

(52) U.S. Cl.
CPC ... *G05B 19/4145* (2013.01); *G05B 19/41885* (2013.01); *G06F 30/20* (2020.01); *G06F 2111/10* (2020.01)

(58) Field of Classification Search
None
See application file for complete search history.

(56) References Cited

U.S. PATENT DOCUMENTS

| 2018/0189433 | A1* | 7/2018 | Belsky | G06F 30/23 |
| 2018/0276316 | A1 | 9/2018 | Brochu et al. | |

(Continued)

FOREIGN PATENT DOCUMENTS

| WO | WO2020069535 | 4/2020 |
| WO | WO2020097578 | 5/2020 |

OTHER PUBLICATIONS

Arisoy et al., "Design and Topology Optimization of Lattice Structures Using Deformable Implicit Surfaces for Additive Manufacturing," in ASME 2015 International Design Engineering Technical Conferences and Computers and Information in Engineering Conference (2015) 11 pages.

(Continued)

*Primary Examiner* — Paul B Yanchus, III
(74) *Attorney, Agent, or Firm* — Fish & Richardson P.C.

(57) ABSTRACT

Methods, systems, and apparatus, including medium-encoded computer program products, for computer aided design of physical structures using generative design processes, where the 3D models of the physical structures are produced so as to facilitate manufacturing of the physical structures using 2.5-axis subtractive manufacturing systems and techniques, include: obtaining a design space for an object to be manufactured, design criteria, and load case(s); iteratively modifying a generatively designed 3D shape of the modeled object, including generating 2D profile representations (corresponding to discrete layers) of an updated version of the 3D shape, extruding the 2D profile representations along the milling direction, and forming a next version of the 3D shape of the modeled object from a combination of the 3D representations produced by the extruding; and providing the generatively designed 3D shape of the modeled object for use in manufacturing the (Continued)

physical structure using a 2.5-axis subtractive manufacturing process.

20 Claims, 12 Drawing Sheets

(51) Int. Cl.
    *G05B 19/418*      (2006.01)
    *G06F 111/10*      (2020.01)

(56) References Cited

U.S. PATENT DOCUMENTS

| | | | |
|---|---|---|---|
| 2018/0285517 | A1 | 10/2018 | Reichental et al. |
| 2018/0345647 | A1 | 12/2018 | Morris et al. |
| 2018/0349531 | A1 | 12/2018 | Morris et al. |
| 2019/0250580 | A1 | 8/2019 | Hebard et al. |
| 2020/0108560 | A1 | 4/2020 | Qian |
| 2020/0150623 | A1 | 5/2020 | Bandara et al. |
| 2020/0151286 | A1 | 5/2020 | Willis et al. |
| 2021/0073349 | A1 | 3/2021 | Mirzendehdel et al. |

OTHER PUBLICATIONS autodesk.com [online], "Specify a Manufacturing Method", published on or before May 7, 2020, [retrieved on May 7, 2020], retrieved from URL<https://help.autodesk.com/view/fusion360/ENU/?guid=GUID-CF2F3B2A-B2C9-41A1-B2D7-19E3401BC25A>, 5 pages.
Brackett et al., "Topology Optimization for Additive Manufacturing," in Proceedings of the Solid Freeform Fabrication Symposium (2011) 15 pages.
Dapogny et al., "Geometric Constraints for Shape and Topology Optimization in Architectural Design," Computational Mechanics, Springer-Verlag, 2017, 59(6):933-965. 10.1007/s00466-017-1383-6. hal-01354004v3.
Gibou et al., "A Review of Level-set Methods and Some Recent Applications," Journal of Computational Physics (2018) 353:82-109.
Guest and Zhu, "Casting and Milling Restrictions in Topology Optimization via Projection-based Algorithms," in ASME 2012 International Design Engineering Technical Conferences and Computers and Information in Engineering Conference (2012) 8 pages.
Ikeya and Shimoda, "Multi-objective Free-form Optimization for Shape and Thickness of Shell Structures with Composite Materials," in 11th World Congress on Structural and Multidisciplinary Optimisation (2015) 6 pages.
Joshi et al., "CAD-integrated Topology Optimization (BGCE Honours Project)," Department of Informatics, Technical University of Munich (2016) 77 pages.
Langelaar, "Topology Optimization for Multi-axis Machining," Comput. Methods Appl. Mech. Engrg. (2019) 351:226-252.
Liu and Ma, "A Survey of Manufacturing Oriented Topology Optimization Methods," Advances in Engineering Software (2016) 100:161-175.
Liu et al., "Current and Future Trends in Topology Optimization for Additive Manufacturing," Structural and Multidisciplinary Optimization (2018) 57:2457-2483.
Lu et al., "Build-to-Last: Strength to Weight 3D Printed Objects," ACM Trans. Graph. (2014) 33(4):97:1-97:10.
Nakayama and Shimoda, "Shape-topology Optimization for Designing Shell Structures," in VII European Congress on Computational Methods in Applied Sciences and Engineering (2016) 10 pages.
Sigmund and Maute, "Topology Optimization Approaches—a Comparative Review," Struct. Multidisc. Optim, (2013) 48:1031-1055.
Ullah et al., "A Boundary Element and Level Set Based Topolgy Optimisation Using Sensitivity Analysis", Engineering Analysis with Boundary Elements, 2015, 70:80-98.
Unknown author, "Topology Optimization R18.0 Feature and Usage Highlights," © 2016 ANSYS, Inc., Mar. 12, 2017, 29 pages.
Van Dijk et al., "Level-set Methods for Structural Topology Optimization: a Review," Struct. Multidisc. Optim, (2013) 48:437-472.
Vatanabe et al., "Topology Optimization with Manufacturing Constraints: a Unified Projection-based Approach," Advances in Engineering Software (2016) 100:97-112.
Weiss et al., "From Concept to Reality in Under a Day with 2.5-Axis Generative Design and CAM", Autodesk University, published on or before May 20, 2020, 119 pages.
Weiss et al., "From Concept to Reality in Under a Day with 2.5-Axis Generative Design and CAM", Autodesk University, published on or before May 20, 2020, 30 page Powerpoint.
Weiss et al., "From Concept to Reality in Under a Day with 2.5-Axis Generative Design and CAM", Autodesk University, published on or before May 20, 2020, 85 pages.
Xia et al., "A Level Set Based Method for the Optimization of Cast Part," Struct. Multidisc. Optim (2010) 41:735-747.
PCT International Search Report and Written Opinion in International Appln. No. PCT/US2020/033454, dated Feb. 18, 2021, 14 pages.
Liu et al., "Topology Optimization for Hybrid Additive-Subtractive Manufacturing", Structural and Multidisciplinary Optimization, Aug. 29, 2016, 55(40:1281-1299).
Morris et al., "A Subtractive Manufacturing Constraint for Level Set Topology Optimization", Structural and Multidisciplinary Optimization, Jul. 3, 2019, 1-16.

\* cited by examiner

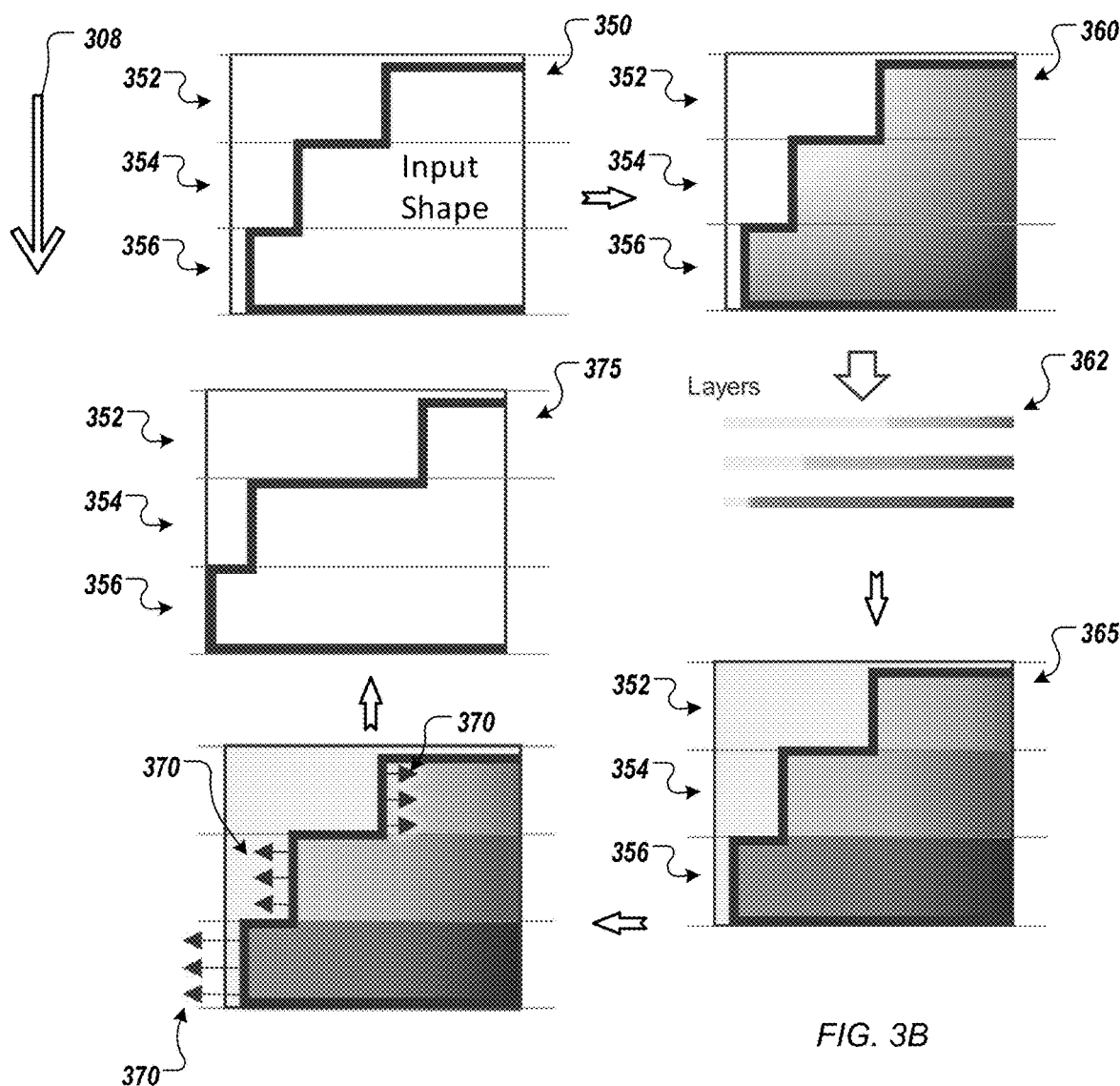
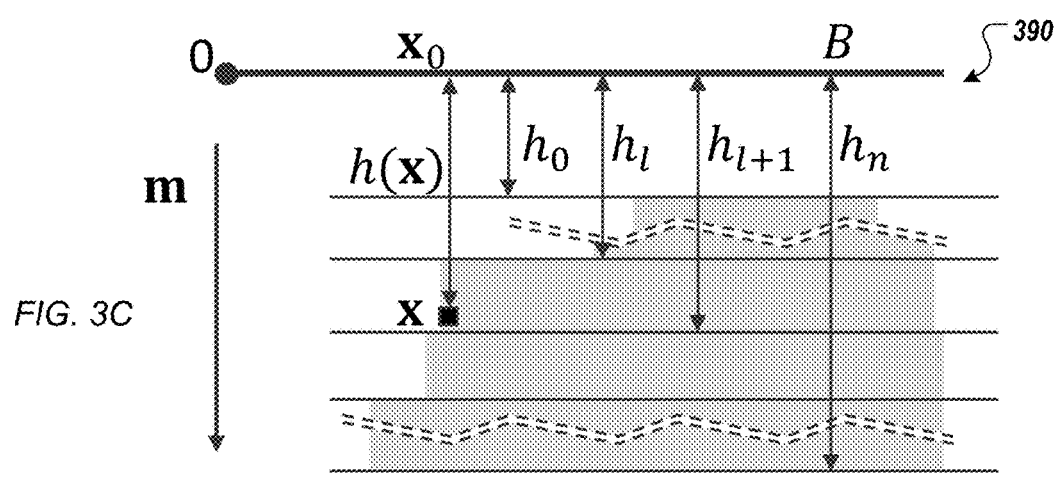
FIG. 3B
FIG. 3C

COMPUTER AIDED GENERATIVE DESIGN WITH FILTERING TO FACILITATE 2.5-AXIS SUBTRACTIVE MANUFACTURING PROCESSES

BACKGROUND

This specification relates to computer aided design of physical structures, which can be manufactured using additive manufacturing, subtractive manufacturing and/or other manufacturing systems and techniques.

Computer Aided Design (CAD) software has been developed and used to generate three-dimensional (3D) representations of objects, and Computer Aided Manufacturing (CAM) software has been developed and used to evaluate, plan and control the manufacture of the physical structures of those objects, e.g., using Computer Numerical Control (CNC) manufacturing techniques. Typically, CAD software stores the 3D representations of the geometry of the objects being modeled using a boundary representation (B-Rep) format. A B-Rep model is a set of connected surface elements specifying boundaries between a solid portion and a non-solid portion of the modelled 3D object. In a B-Rep model (often referred to as a B-Rep), geometry is stored in the computer using smooth and precise mathematical surfaces, in contrast to the discrete and approximate surfaces of a mesh model, which can be difficult to work with in a CAD program.

CAD programs have been used in conjunction with subtractive manufacturing systems and techniques. Subtractive manufacturing refers to any manufacturing process where 3D objects are created from stock material (generally a "blank" or "workpiece" that is larger than the 3D object) by cutting away portions of the stock material. Such manufacturing processes typically involve the use of multiple CNC machine cutting tools in a series of operations, starting with a roughing operation, an optional semi-finishing operation, and a finishing operation. In addition to CNC machining, other subtractive manufacturing techniques include electrode discharge machining, chemical machining, waterjet machining, etc. In contrast, additive manufacturing, also known as solid free form fabrication or 3D printing, refers to any manufacturing process where 3D objects are built up from raw material (generally powders, liquids, suspensions, or molten solids) in a series of layers or cross-sections. Examples of additive manufacturing include Fused Filament Fabrication (FFF) and Selective Laser Sintering (SLS). Other manufacturing techniques for building 3D objects from raw materials include casting and forging (both hot and cold).

In addition, CAD software has been designed so as to perform automatic generation of 3D geometry using topology optimization (generative design) for a part or one or more parts in a larger system of parts to be manufactured. This automated generation of 3D geometry is often limited to a design space specified by a user of the CAD software, and the 3D geometry generation is typically governed by design objectives and constraints, which can be defined by the user of the CAD software or by another party and imported into the CAD software. The design objectives (such as minimizing weight of the designed part) can be used to drive the geometry generation process toward better designs. The design constraints can include both structural integrity constraints for individual parts (i.e., a requirement that a part should not fail under the expected structural loading during use of the part) and physical constraints imposed by a larger system (i.e., a requirement that a part not interfere with another part in a system during use). Further, examples of design constraints include maximum mass, maximum deflection under load, maximum stress, etc.

The inputs to a generative design process can include a set of input solids (B-Rep input) that specify boundary conditions for the generative design process, but many modern generative design solvers do not operate directly on the exact surface boundary representation of their input solids. Instead, B-Reps are sampled and replaced with volumetric representations such as level sets or tetrahedral or hexahedral meshes, which are significantly more convenient and efficient for the physical simulations and material synthesis computed by the solver. The set of input solids can include "preserve bodies", which should always be present in the design and which represent interfaces to other parts of the systems or locations on which boundary conditions should be applied (for example mechanical loads and constraints). Other regions in which geometry should or should not be generated can also be provided in a similar manner, such as input solids that define "obstacle bodies", which represent regions where new geometry should not be generated.

SUMMARY

This specification describes technologies relating to computer aided design of physical structures using generative design processes, where the three-dimensional (3D) models of the physical structures are produced so as to facilitate manufacturing of the physical structures using 2.5-axis subtractive manufacturing systems and techniques. Subtractive manufacturing techniques can include 2-axis, 2.5-axis, 3-axis or more-axis milling; 2-axis milling can cut through a stock without the ability to adjust the height level of the milling head; 3-axis milling can cut through a stock while moving the milling tool in three separate dimensions; 2.5-axis milling can use a 3-axis milling machine, as the milling tool (or combination of the milling tool and the fixture support) can be moved in all three separate dimensions, but during most of the cutting operations, the milling tool is only moved in 2 axes with respect to the workpiece, which results a more efficient manufacturing process.

In general, one or more aspects of the subject matter described in this specification can be embodied in one or more methods (and also one or more non-transitory computer-readable mediums tangibly encoding a computer program operable to cause data processing apparatus to perform operations), including: obtaining, by a computer aided design program, a design space for a modeled object, for which a corresponding physical structure is to be manufactured using a 2.5-axis subtractive manufacturing process, one or more design criteria for the modeled object, and one or more in-use load cases for the physical structure; iteratively modifying, by the computer aided design program, a generatively designed three dimensional shape of the modeled object, including modifying both a geometry of the three dimensional shape and a topology of the three dimensional shape, in the design space in accordance with the one or more design criteria and the one or more in-use load cases, wherein the iteratively modifying includes performing numerical simulation of the modeled object in accordance with a current version of the three dimensional shape and the one or more in-use load cases to produce a current numerical assessment of a physical response of the modeled object, updating the current version of the three dimensional shape based on the current numerical assessment of the physical response to produce an updated version of the three dimensional shape of the modeled object, generating two dimensional profile representations of the updated version of the three dimensional shape, wherein the two dimensional profile representations correspond to discrete layers that are perpendicular to a milling direction of the 2.5-axis subtractive manufacturing process, extruding the two dimensional profile representations along the milling direction to produce three dimensional representations of the updated version of the three dimensional shape, wherein the three dimensional representations have flank faces with normals perpendicular to the milling direction, forming a next version of the three dimensional shape of the modeled object from a combination of the three dimensional representations having flank faces with normals perpendicular to the milling direction, and repeating at least the performing, the updating, the generating, the extruding and the forming until a predefined number of shape modification iterations have been performed, the generatively designed three dimensional shape of the modeled object in the design space satisfies the one or more design criteria and the one or more in-use load cases, or both; and providing, by the computer aided design program, the generatively designed three dimensional shape of the modeled object for use in manufacturing the physical structure using one or more computer-controlled manufacturing systems that employ the 2.5-axis subtractive manufacturing process.

The generating can include generating each of the two dimensional profile representations for a corresponding discrete layer by determining a silhouette of one or more portions of the updated version of the three dimensional shape that lie within both the corresponding discrete layer and any of the discrete layers above the corresponding discrete layer with respect to the milling direction. The milling direction can include two or more milling directions having respective sets of discrete layers, the generating can be performed for each of the two or more milling directions to produce respective sets of two dimensional profile representations of the updated version of the three dimensional shape, the extruding can be performed for each of the two or more milling directions to produce respective sets of three dimensional representations having flank faces with normals perpendicular to the respective two or more milling directions, and the forming can include: performing a Boolean union of the three dimensional representations in the respective sets of three dimensional representations to produce one or more three dimensional bodies for each of the two or more milling directions; and performing a Boolean intersection of the three dimensional bodies produced for the two or more milling directions to form the next version of the three dimensional shape of the modeled object.

The iteratively modifying can include producing, for each of multiple iterations, the current version of the three dimensional shape of the modeled object by mixing the next version of the three dimensional shape from a prior iteration with the updated version of the three dimensional shape from the prior iteration, wherein an amount of the next version used in the mixing increases relative to an amount of the updated version, each of two or more subsequent ones of the multiple iterations, until none of the updated version and all of the next version is used as the current version of the three dimensional shape of the modeled object in a next iteration of the modifying.

The generatively designed three dimensional shape of the modeled object can include a level-set representation of an implicit surface of the modeled object, and the updating can include updating the level-set representation in accordance with shape change velocities computed for the implicit surface based on the current numerical assessment of the physical response. The iteratively modifying can include, before the extruding: offsetting outward each of the two dimensional profile representations by an amount that is at least equal to a radius of a smallest milling tool available for use with the one or more computer-controlled manufacturing systems; and subsequently offsetting inward each of the two dimensional profile representations by the amount.

The method (or operations performed by the data processing apparatus in accordance with the computer program tangibly encoded in one or more non-transitory computer-readable mediums) can include setting the amount for offsetting a two dimensional profile representation for one of the discrete layers based on an amount of tool penetration into the physical structure that is needed during the 2.5-axis subtractive manufacturing process to mill the one discrete layer for the two dimensional profile representation. Generating the two dimensional profile representation for the corresponding discrete layer can include casting rays along the milling direction through the level-set representation of the implicit surface from the top portion of the upper most discrete layer down to the bottom portion of the corresponding discrete layer, and the setting can include setting the amount to the maximum of (i) the radius of the smallest milling tool available and (ii) a predefined fraction of the difference, the predefined fraction being greater than zero and less than one.

The method (or operations performed by the data processing apparatus in accordance with the computer program tangibly encoded in one or more non-transitory computer-readable mediums) can include: comparing the two dimensional profile representations to identify at least a first profile representation above a second profile representation, with respect to the milling direction, wherein a distance between a first portion of the first profile representation and a second portion of the second profile representation is below a threshold distance; changing the first portion of the first profile representation to match the second portion of the second profile representation; and modifying the first profile representation on either side of the first portion to remove any discontinuities in the first profile representation resulting from the changing. Modifying the topology of the three dimensional shape can include inserting voids into the level-set representation at locations selected using a center line generated for at least one of the two dimensional profile representations, to change the implicit surface during at least some of multiple iterations of the iteratively modifying.

The updating can include: filtering the current numerical assessment in the respective discrete layers to produce a filtered physical assessment that encourages modification of the geometry of the implicit surface of the three dimensional shape consistent with the 2.5-axis subtractive manufacturing process during the updating; and updating the current version of the three dimensional shape in accordance with the filtered physical assessment. The generatively designed three dimensional shape of the modeled object can include a level-set representation of the implicit surface, and the filtering can include: finding, within respective ones of the discrete layers, maximum values in the current numerical assessment along the milling direction; and resetting values of the current numerical assessment, within the respective ones of the discrete layers, based on the maximum values to produce the filtered physical assessment.

The current numerical assessment can include voxel-based stress field data, strain field data or both, the finding can include casting rays, which are parallel to the milling direction, through the current version of the three dimensional shape of the modeled object, within respective ones of the discrete layers, and collecting in respective two dimensional areas for the discrete layers a maximum value of the stress and/or strain data encountered along each of the rays, and the resetting can include setting the stress and/or strain data in each voxel, within respective ones of the discrete layers, equal to the maximum value in a location in the discrete layer's corresponding two dimensional area that is closest to the voxel.

The method (or operations performed by the data processing apparatus in accordance with the computer program tangibly encoded in one or more non-transitory computer-readable mediums) can include removing, by the computer aided design program, any portions of the generatively designed three dimensional shape of the modeled object that are smaller than a minimum feature size in at least one principal axis of the 2.5-axis subtractive manufacturing process. The providing can include saving the generatively designed three dimensional shape of the modeled object to a permanent storage device for use in manufacturing the physical structure using the one or more computer-controlled manufacturing systems. The providing can include: generating toolpath specifications for a subtractive manufacturing machine, in accordance with the 2.5-axis subtractive manufacturing process, using the generatively designed three dimensional shape of the modeled object; and manufacturing at least a portion of the physical structure, or a mold for the physical structure, with the subtractive manufacturing machine using the toolpath specifications.

One or more aspects of the subject matter described in this specification can also be embodied in one or more systems including: a non-transitory storage medium having instructions of a computer aided design program stored thereon; and one or more data processing apparatus configured to run the instructions of the computer aided design program to perform any of the one or more methods described herein. The one or more systems can further include a 2.5-axis subtractive manufacturing machine or other subtractive manufacturing machine that can perform a 2.5-axis subtractive manufacturing process, such as a 3-axis or 5-axis subtractive manufacturing machine.

Particular embodiments of the subject matter described in this specification can be implemented to realize one or more of the following advantages. Geometry filtering can be employed such that a 2.5-axis manufacturable outcome is guaranteed from a generative design process, and this can be done such that the 2.5-axis manufacturable outcome is achieved at every optimization iteration, or the geometry filtering can be mixed into the shape and topology optimization over the course of multiple iterations to give more flexibility in shape and topology changes early in the generative design process, while still ensuring a 2.5-axis manufacturable outcome. Thus, a three dimensional model of a physical structure can be produced in a generative design process, where the model necessarily includes flat top, bottom and flank regions that facilitate 2.5-axis milling. This can result in reduced CAM programming time, machining time, less need for custom fixtures for clamping, or a combination of the foregoing during machining of the physical structure in a 2.5-axis subtractive manufacturing process.

Further, simulation results filtering (e.g., strain energy filtering) can be performed (either with or without geometry filtering) to encourage the production of a 2.5-axis manufacturable outcome from a generative design process. If the geometry is represented using signed distance fields, radii can be efficiently created to ensure the generated geometry is everywhere accessible by a tool with specified radius using a variant on the morphological closing operator from image processing, implemented using an outward advection or offset followed by an inward advection or offset. Tool accessibility can be further ensured using dynamic tool sizing based on depth of cut into the part during manufacturing so that inexpensive, readily-available tools can be used to machine the part, and nearly-overlapping layers can be aligned to eliminate thin shelves in the final three dimensional model. Voids can be generated to further enable topology changes using shape skeletons, and multiple milling directions can be handled (two or more machining setups).

Moreover, the parts that are generatively designed using the 2.5-axis manufacturing design limitation systems and techniques described herein may be weight-competitive (roughly equivalent mass reduction) with parts that are generatively designed using a 2-axis manufacturing design limitation or no limitations on machining axes, but these parts can also exhibit about half the maximum deflection as the 2-axis solutions, while still getting the benefits of reduced CAM programming time, machining time, and less need for custom fixtures for clamping, as compared with a part that is generatively designed with no manufacturing constraints. In addition, the generated geometry appears closer to a traditionally-designed shape, making manual design alterations easier to envision and implement, and reducing the gap between manufacturing planning and execution of traditional designs and 2.5-axis generative designs.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 3B shows a graphical representation of simulation results filtering in respective discrete layers.

FIG. 3C shows a graphical representation of discrete layers within a modelled object.

Like reference numbers and designations in the various drawings indicate like elements.

DETAILED DESCRIPTION

Figure 1A:
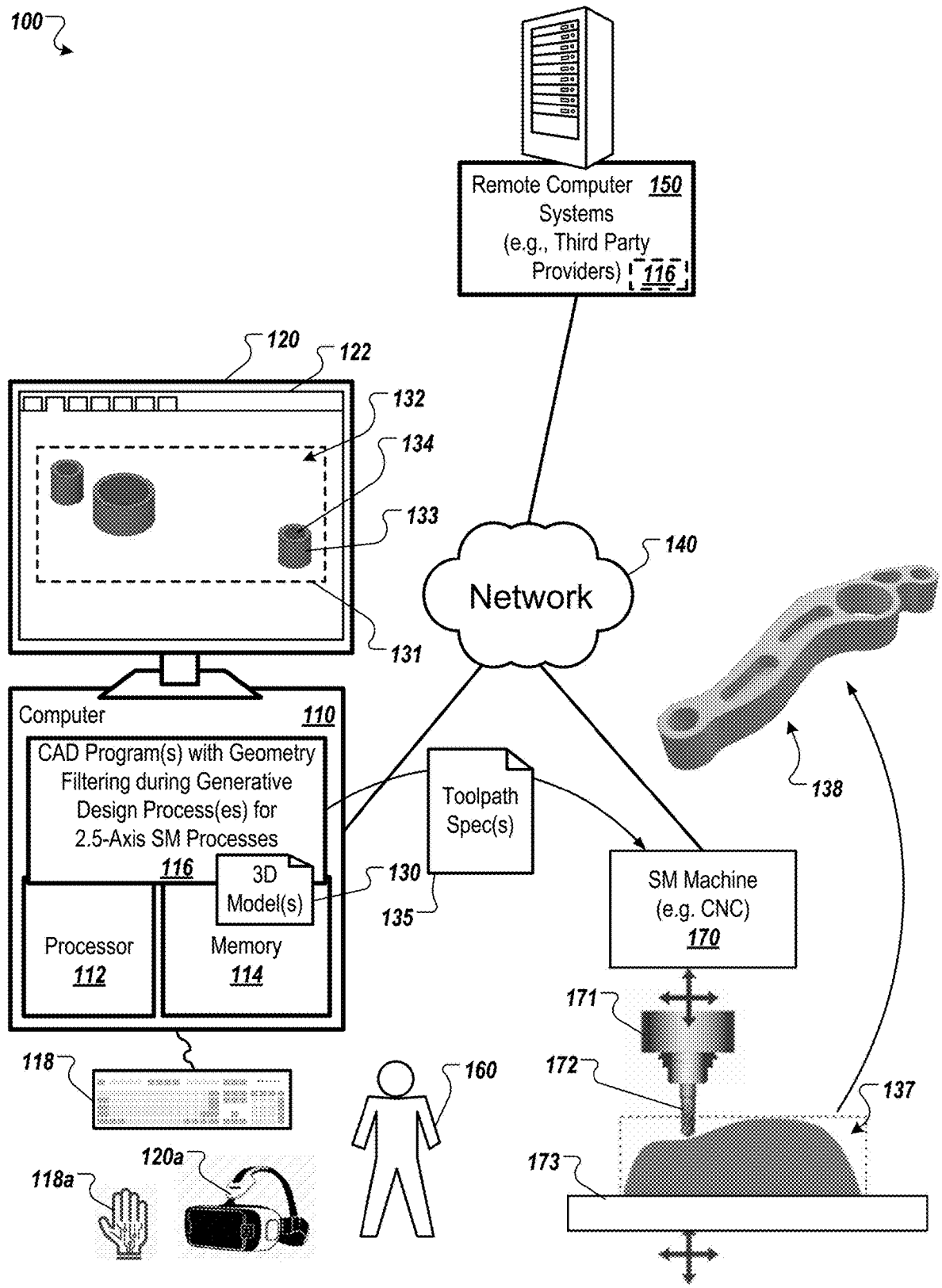
FIG. 1A shows an example of a system usable to perform geometry filtering and/or simulation results filtering during generative design to produce physical structures that are tailored for manufacturing with a 2.5-axis subtractive manufacturing process.

FIG. 1A shows an example of a system 100 usable to perform geometry filtering and/or simulation results filtering during generative design to produce physical structures that are tailored for manufacturing with a 2.5-axis subtractive manufacturing process. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including Computer Aided Design (CAD) program(s) 116, which implement three-dimensional (3D) modeling functions and includes one or more generative design processes for topology optimization (e.g., using at least one level-set method as described) with numerical simulation. The numerical simulation performed by the systems and techniques described in this document can simulate one or more physical properties and can use one or more types of simulation to produce a numerical assessment of physical response (e.g., structural response) of the modelled object. For example, finite element analysis (FEA), including linear static FEA, finite difference method(s), and material point method(s) can be used. Further, the simulation of physical properties can include Computational Fluid Dynamics (CFD), Acoustics/Noise Control, thermal conduction, computational injection molding, electric or electro-magnetic flux, and/or material solidification (which is useful for phase changes in molding processes) simulations. Moreover, the CAD program(s) 116 can potentially implement hole and/or fixture generation techniques to support clamping during manufacturing and/or manufacturing control functions.

As used herein, CAD refers to any suitable program used to design physical structures that meet design requirements, regardless of whether or not the program is capable of interfacing with and/or controlling manufacturing equipment. Thus, CAD program(s) 116 can include Computer Aided Engineering (CAE) program(s), Computer Aided Manufacturing (CAM) program(s), etc. The program(s) 116 can run locally on computer 110, remotely on a computer of one or more remote computer systems 150 (e.g., one or more third party providers' one or more server systems accessible by the computer 110 via the network 140) or both locally and remotely. Thus, a CAD program 116 can be two or more programs that operate cooperatively on two or more separate computer processors in that one or more programs 116 operating locally at computer 110 can offload processing operations (e.g., generative design and/or physical simulation operations) "to the cloud" by having one or more programs 116 on one or more computers 150 perform the offloaded processing operations. In some implementations, all generative design operations are run by one or more programs in the cloud and not in the B-Rep solid modeler that runs on the local computer. Moreover, in some implementations, the generative design program(s) can be run in the cloud from an API (Application Program Interface) that is called by a program, without user input through a graphical user interface.

The CAD program(s) 116 present a user interface (UI) 122 on a display device 120 of the computer 110, which can be operated using one or more input devices 118 of the computer 110 (e.g., keyboard and mouse). Note that while shown as separate devices in FIG. 1A, the display device 120 and/or input devices 118 can also be integrated with each other and/or with the computer 110, such as in a tablet computer (e.g., a touch screen can be an input/output device 118, 120). Moreover, the computer 110 can include or be part of a virtual reality (VR) and/or augmented reality (AR) system. For example, the input/output devices 118, 120 can include a VR/AR input glove 118a and/or a VR/AR headset 120a. In any case, a user 160 interacts with the CAD program(s) 116 to create and modify 3D model(s), which can be stored in 3D model document(s) 130.

An initial 3D model 132 can be an input to a generative design process. In the example shown, the initial 3D model 132 is a set of preserve bodies, such as preserve body 133, and obstacle bodies, such as obstacle body 134. A design space 131 can be obtained by determining a bounding volume or a convex hull for the input model 132, or another technique can be used to obtain the design space, which is the volume of space inside which the part is to be designed during topology optimization. In some cases, the user may explicitly specify a solid body as the design space. The user 160 can define a topology optimization problem for a generative design process to produce a desired 3D model from a starting 3D model, or the input can be a design space without a specific starting 3D model. In general, the input design space can be automatically generated or user specified. Note that the generative design process itself can produce starting geometry within the design space. One or more seed models can be used as input to the generative design process to introduce holes at the start of the shape evolution so as to modify the topology of the generative design. In addition, as shown, a starting model 132 can be input preserve geometry, which can be unconnected modelled solids, where the generative design process is used to produce new 3D geometry that connects the input preserve solids.

As described herein, the CAD program(s) 116 implement at least one generative design process, which enables the CAD program(s) 116 to generate one or more portions of the 3D model(s) (or the entirety of a 3D model) automatically based on design objective(s) and constraint(s), i.e., design criteria, where the geometric design is iteratively optimized based on simulation feedback. Note that, as used herein, "optimization" (or "optimum") does not mean that the best of all possible designs is achieved in all cases, but rather, that a best (or near to best) design is selected from a finite set of possible designs that can be generated within an allotted time, given the available processing resources.

The design criteria can be defined by the user 160, or by another party and imported into the CAD program(s) 116. The design criteria can include structural integrity constraints for individual parts (e.g., a requirement that a part should not fail under the expected structural loading during use of the part) and physical constraints imposed by a larger system (e.g., a requirement that a part be contained within a specified volume so as not to interfere with other part(s) in a system during use). The design criteria can also include a desired 2.5-axis subtractive manufacturing process to be facilitated (e.g., using a 2.5 axis CNC machine, or 3 or 5 axis CNC machines).

Various generative design processes can be used, which can optimize the shape and topology of at least a portion of the 3D model. The optimization of the geometric design of the 3D model(s) by the CAD program(s) 116 involves topology optimization, which is a method of light-weighting where the optimum distribution of material is determined by minimizing an objective function subject to design constraints (e.g., structural compliance with volume as a constraint). There are two primary categories of topology optimization, density-based approaches and boundary-based approaches. Density-based approaches discretize the volume of the part, and assign a density to each discrete cell, such as in a Solid Isotropic Material with Penalization (SIMP) method. Then the densities are driven toward solid and empty while minimizing the objective(s) subject to the constraints. Boundary-based approaches instead track the shape of the external interface of the solid part and move the boundary such that the constraints are satisfied and the objective(s) are minimized, such as in a level-set method.

As described herein, filtering during topology optimization can guide the generative design process to produce a final shape for the design that facilitates manufacture of the physical structure using a 2.5-axis manufacturing process. Such filtering can be performed with density-based topology optimization or boundary-based topology optimization. In some implementations, a level-set representation method is used to track the boundary of the shape during topology optimization, which has the advantages of providing precise knowledge of the boundary, and allowing topological changes as the surface evolves without the need for re-meshing. In any case, note that the shape synthesis process can (and often will) be done using a different representation of geometry than that employed by the CAD program(s) 116 for 3D modelling. For example, the CAD program(s) 116 can use a B-Rep model for the input geometry 132, while the geometry generation engine in the generative design process (e.g., in CAD program(s) 116) can employ a level-set function embedded in a voxel or tetrahedral mesh. Further details regarding the generative design process are provided below, such as in connection with FIG. 1B.

Once the user 160 is satisfied with a generatively designed 3D model, the 3D model can be stored as a 3D model document 130 and/or used to generate another representation of the model (e.g., toolpath specifications for a 2.5-axis subtractive manufacturing process). This can be done upon request by the user 160, or in light of the user's request for another action, such as sending the generatively designed 3D model to a subtractive manufacturing (SM) machine 170, or other manufacturing machinery, which can be directly connected to the computer 110, or connected via a network 140, as shown. This can involve a post-process carried out on the local computer 110 or a cloud service to export the 3D model to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files. In addition, the user 160 can save or transmit the 3D model for later use. For example, the CAD program(s) 116 can store the document 130 that includes the generated 3D model.

The CAD program(s) 116 can provide a document 135 (having toolpath specifications of an appropriate format) to the SM machine 170 to create a complete structure 138 from stock material 137, where the physical structure 138 includes the optimized topology and shape that facilitates 2.5-axis machining, a staircase-like design generated for 2.5-axis milling. The SM machine 170 can employ one or more subtractive manufacturing techniques, e.g., a Computer Numerical Control (CNC) milling machine, such as a multi-axis, multi-tool milling machine. The SM machine 170 can be a 2.5-axis CNC machine, where the freedom of movement of the spindle 171 and attached cutting tool 172 is limited to the X-Y plane for most milling, and only moves in the Z direction in discrete steps. However, the SM machine 170 can also be a 3-axis CNC machine, where the spindle 171 has full freedom of movement in each of the X, Y and Z dimensions, or the SM machine 170 can be a 5-axis machine, where additional axes of motion (e.g., roll and yaw rotations) are also possible.

Note that these additional freedoms of movement can be effected by computer controlled motion of the spindle 171, computer controlled motion of a clamp or anchor point 173 for the part being machined, or both in combination. The CNC machine 170 should in some way anchor the stock during machining to prevent unintended movement, and sometimes the location of the anchoring of the stock should be changed (typically through a human operator, though other methods exist) so that portions of the stock which were previously used in the anchoring process can be exposed for subsequent cutting by the CNC machine 170. These orientations or arrangements of the part and its anchor are known as "setups".

Subtractive manufacturing processes typically begin with a solid block of stock material and gradually remove material from the stock. One of the common subtractive approaches is milling, which uses rotary cutters or routers, also known as "tools" or "bits", to remove the material. The milling process can limit the types of shapes that can be manufactured because the milling machine must be able to hold the part rigidly and the rotary bit must be able to access the material surface without interference. Other important considerations that should to be taken into account are vibration of the part during material removal and stresses on the bit itself by the milling process.

Subtractive manufacturing techniques can include 2-axis, 2.5-axis, 3-axis or more-axis milling; 2-axis milling can cut through a stock without the ability to adjust the height level of the milling head; 3-axis milling can cut through a stock while moving the milling tool in three separate dimensions; 2.5-axis milling can use a 3-axis milling machine, as the milling tool (or combination of the milling tool and the fixture support) can be moved in all three separate dimensions, but during most of the cutting operations, the milling tool is only moved in 2 axes with respect to the workpiece, which results a more efficient manufacturing process. In the case of 2.5-axis milling, the subtractive process occurs with continuous movement in the plane perpendicular to the milling tool, but in discrete steps parallel to the milling tool. This is in contrast with 3-axis milling, which has continuous movement in both the plane perpendicular to the milling tool and the dimension parallel to the milling tool. In other words, the 3-axis milling can have continuous movement in all three directions. Compared with 3-axis subtractive manufacturing, the 2.5-axis subtractive manufacturing process can rapidly remove layers of material in sequence, and create parts that often have a series of "pockets" at varying depths. Targeting 2.5-axis subtractive manufacturing means the geometry should have a layered or staircase shape, which allows for much more rapid programming of the subtractive machine toolpaths as well as much shorter machining time.

Thus, regardless of the degrees of freedom of movement and the anchoring capabilities of the SM machine 170, the SM machine 170 can perform a 2.5-axis machining process, and "2.5-axis machining" refers to a kind of CNC machining in which two axes move synchronously (typically under computer control) while a third moves only incrementally to create a series of "tiers" in the part geometry. The walls and floor of each tier can be cut by the sides and end of the tool, respectively, which is much more efficient than contoured ("3-axis") surfaces, which must be machined in many passes by a tool which only contacts the part at a single point. At the same time, 2.5-axis machining provides improved control of the geometry over 2-axis machining, in which the tool always cuts all the way through the part. Because the generative design process(es) in the CAD program(s) 116 produce 2.5-axis compatible geometries, this results in significant savings in programming time and machining time for the SM machine 170, as a result of using the simpler geometry for the part, even if the SM machine 170 could handle more complicated geometry for the part.

In various implementations, the CAD program(s) 116 of the system 100 can implement one or more generative design processes as described in this document. Generative design processes seek an optimal geometric shape, topology, or both. For example, generative design processes seek an optimal geometric shape among alternative designs by minimizing a performance-related objective function subject to constraints:

$$\text{minimize } J(s,u(s))s \in \mathbb{R}^{n_s} \quad (1)$$

$$\text{such that } g_i(s,u(s))=0 \; i=1,\ldots,n_g \quad (2)$$

where s is a vector of design variables related to a geometric shape of the domain, and u is a vector of state variables (e.g., displacement) that depend on s. Additional constraints (e.g., equilibrium) are denoted by a set $g_i$. For simplicity, equality constraints are assumed here. Mathematical programming methods used to minimize Equation (1) can be gradient-based or non-gradient-based. Gradient-based methods (versus non-gradient-based methods) generally use more information associated with design sensitivity, for example:

$$\frac{dJ}{ds}(s, u(s)) = \frac{\partial J}{\partial s} + \frac{\partial J}{\partial u}\frac{du}{ds} \quad (3)$$

which is a derivative of the performance-related objective function with respect to the design variables. In level-set based topology optimization methods, s represents a boundary of a solid region.

Figure 1B:
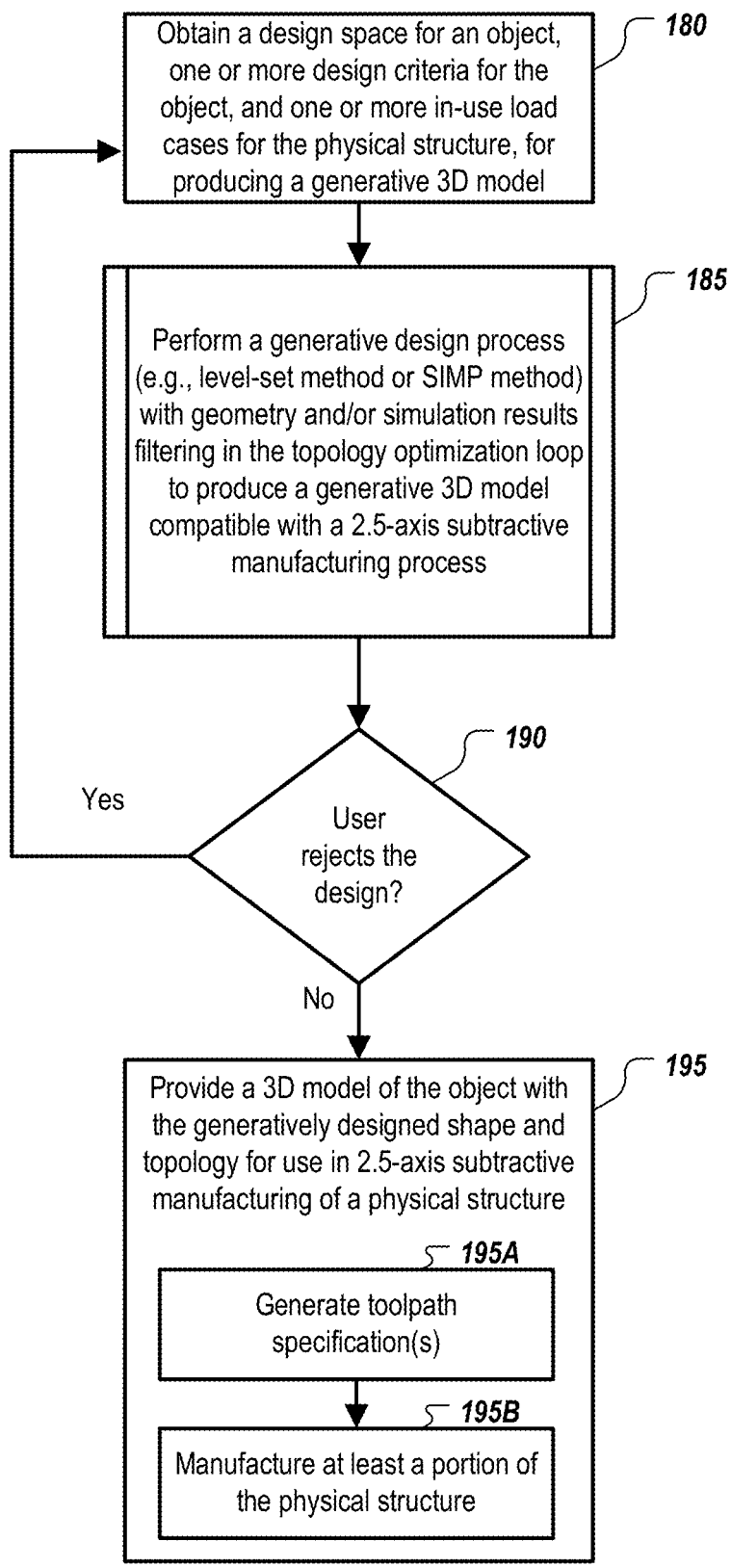
FIG. 1B shows an example of a process of generative design with geometry filtering and/or simulation results filtering and manufacturing physical structures using a 2.5-axis subtractive manufacturing process.

FIG. 1B shows an example of a process of generative design with geometry filtering and/or simulation results filtering and manufacturing physical structures using a 2.5-axis subtractive manufacturing process. A design space for an object, one or more design criteria and one or more in-use load cases are obtained 180, e.g., by CAD program(s) 116, for use in producing a generative 3D model. The design space for the modelled object is the volume inside which the part is to be designed. The design space can include a bounding volume containing an initial specification of one or more outer shapes of the three dimensional topology for the object. As noted above, the design space can include 3D model(s), designed in or loaded into CAD program(s) 116, that serves as a sub-space of an optimization domain of a described generative design process, and/or a set of input solids that specify boundary conditions for generative design geometry production, e.g., B-Reps selected using UI 122 to specify sub-space(s) that are preserved for use as connection point(s) with other component(s) in a larger 3D model or separate 3D model(s).

The design criteria can include design objective(s) and design constraint(s) for the object. Design objectives can include but are not limited to minimizing waste material, minimizing the weight of the part, and minimizing the compliance, stress, or other intrinsic property of the part, and are used to drive the shape synthesis process towards better designs. Though not required, it is typical for a design objective to be rooted in a simulation of the design (linear static, fluid dynamic, electromagnetic, etc.). Design constraints can include a variety of geometric and physical characteristics or behaviors that should be met in any generated design (requirements either on individual parts or on the entire assembly are also admissible); examples include maximum mass, maximum deflection under load, maximum stress, etc.

Further, different generative design processes can be formulated by using different combinations of design parameters and design variables. In some implementations, the design parameters can include various types of inputs, received through UI 122, such as selection among different generative design synthesis methods made available by CAD program(s) in the system 100. In some implementations, the available generative design synthesis methods can include a level-set-based topology optimization that provides a basic level-set method for topology optimization. Other generative design synthesis methods are also possible and can be provided by CAD program(s) in the system 100. Different combinations of design parameters and design variables can be used, e.g., by CAD program(s) 116 in response to input from the user 160. For example, a user 160 may select different generative design synthesis methods to use within respective different design spaces within a single 3D model.

Further, the obtained 180 one or more in-use load cases are for the physical structure that will be manufactured from the generatively designed part using a 2.5-axis subtractive manufacturing process. The one or more in-use load cases can be associated with a setup for numerical simulation, e.g., densities of elements in an FEA model to be used with an optimized 3D topology of the part being generatively designed. However, as used herein, "in-use load cases" refer generally to separate groups of loads and constraints under which part performance is evaluated and correspond to sets of boundary conditions for various types of physics simulations, such as fluid flow simulation, electro-magnetic (EM) behavior simulation, mutliphysics simulation, etc.

In general, the setup for numerical simulation can include one or more physical properties to be simulated and one or more types of simulation to be performed, as well as potentially surrogate modelling or other methods of approximation. In some implementations, the type of numerical simulation is predefined, either for all uses of the program or given a particular context in the program from which the generative design process has been launched. Further, the setup for numerical simulation can include at least one set of loading conditions and/or other physical environment information associated with the type of numerical simulation to be performed.

With the generative design space and design criteria specified, one or more 3D model(s) are produced 185, e.g., by CAD program(s) 116, using one or more generative design processes, where the physical structure(s) corresponding to these 3D model(s) are designed to be manufactured using a 2.5-axis subtractive manufacturing process. The one or more generative design processes performed, e.g., by CAD program(s) 116, can include a boundary-based generative design process (e.g., using a level-set method) of topology optimization, a density-based generative design process (e.g., using a SIMP method), or both. In some implementations, the one or more generative design processes can use the described level-set methods, where s, from equations (1), (2) and (3), represents a boundary of a solid region that is implicitly represented using one or more level-sets, which can be stored as sampled values on a background grid or mesh. In a level-set-based topology optimization method, the outer shape of a structure is represented by a contour of the level set function, and a change in shape and configuration is represented by a change in the level set function value.

The level set function refers to a function that indicates whether each part of the design domain where the initial structure is set corresponds to a material domain (material phase) that forms the structure and is occupied by a material, a void domain (void phase) where a void is formed, or a boundary between these two domains, wherein a pre-determined value between a value representing the material domain and a value representing the void domain represents the boundary between the material domain and the void domain. In some implementations, the level set function is represented implicitly by storing sampled values of the function in a discrete background gird or mesh. A signed distance field is an example of such a level set function, where the zero-contour represents the shape boundary, positive values of the function correspond to points exterior to the material domain and quantify the distance between the point and the nearest domain surface, and negative values correspond to points interior to the material domain and quantify the distance between the point and the nearest domain surface.

In any case, the production 185 of the 3D model(s) involves iteratively modifying, e.g., by CAD program(s) 116, a generatively designed three dimensional shape of the modeled object. This includes modifying both a geometry of the three dimensional shape (e.g., with SIMP or level-set methods) and a topology of the three dimensional shape (e.g., adding holes or voids to modify the spatial properties of the surface that are unaffected by continuous deformation without tearing, thus changing how shape elements are bounded and connected in the 3D model). Moreover, the production 185 of the 3D model(s) can employ geometry filtering and/or simulation results filtering (as described in detail in throughout this document) in the topology optimization loop to produce one or more generative 3D models that are compatible with a 2.5-axis subtractive manufacturing process. Such 3D models can have discrete height layers corresponding to the 2.5-axis subtractive manufacturing process, where the discrete height layers create flat areas in the one or more 3D model(s) that facilitate manufacturing of the corresponding physical structure(s).

This is in contrast with a traditional topology optimization focused on minimizing some physical response of the part under a volume constraint, which often produces complex, intricate shapes that are difficult to manufacture and must be used as inspiration for a human designer in subsequent design iterations. But in addition to generating designs that meet performance requirements, the production 185 can take account of cost and manufacturability by encouraging or forcing the generative design outcomes to be compatible with 2.5-axis machining, thus producing designs that are easier and cheaper to manufacture, and readily usable in downstream design activities. The production 185 can produce large flat regions perpendicular to the tool axis, as well as flank faces parallel to the tool access and accessible by the tool, both resulting in a geometry that is more readily machined. This is true even for multi-axis CNC milling machines, as the milling process is enhanced by facilitating flank milling and face milling, removing stock material using the side (flank) and face of the machining tool, respectively.

The iterative modification 185 of the generatively designed 3D shape of the modelled object can encourage or constrain the geometry generation process to produce shapes that can be manufactured using 2.5-axis machining. In some implementations, geometry filtering is used such that the geometry is updated after each shape synthesis operation to ensure a 2.5-axis tiered structure accessible by one or more specified tools. Further details regarding such implementations are described below in connection with FIGS. 2A-2F. In some implementations, simulation results filtering is used to filter the physical quantities from which the boundary velocity of the shape is derived to help the optimizer create a 2.5-axis machinable structure. Further details regarding such implementations are described below in connection with FIGS. 3A-3C. In addition, in some implementations, void generation and other techniques are used to improve the convergence rate for the shape optimization and the quality of the generated outcomes. Further details regarding such implementations are described below in connection with FIGS. 4A-4D. Moreover, multiple milling directions and part setups can also be handled in all these various implementations. Further details regarding such implementations are described below in connection with FIGS. 5A & 5B.

The result of generative design processing can be presented to the user, e.g., in UI 122 on display device 120, along with an option 190 to accept or reject the design. For example, a 3D model produced by the generative design processing can be presented to the user 160 in UI 122. In some implementations, the user can select from the final design or any of a variety of previous iterations for each design study. In some implementations, two or more 3D models resulting from the generative design process can be presented to the user along with trade-off analysis of design complexity versus cost of manufacturing (or any of a variety of other quantities of interest). The trade-off analysis can assist a user 160 to accept or reject one or more 3D models among the presented 3D models.

If the design is rejected, the process of FIG. 1B can return to obtain 180, e.g., by CAD program(s) 116, new design space and/or new design criteria for use in producing a new generative 3D model. Once a design in not rejected 190, the process of FIG. 1B can provide 195, e.g., by CAD program(s) 116, the 3D model of the object with the generatively designed shape and topology for use in 2.5-axis subtractive manufacturing of a physical structure. The providing 195 can involve sending or saving the 3D model to a permanent storage device for use in manufacturing the physical structure corresponding to the object using SM manufacturing systems. In some implementations, the providing 195 involves generating 195A, e.g., by CAD program(s) 116, toolpath specifications for the computer-controlled SM manufacturing system(s) using the 3D model, and manufacturing 195B, e.g., by CAD program(s) 116, at least a portion of the physical structure corresponding to the object with the computer-controlled SM manufacturing system(s) using the toolpath specifications generated for the 2.5-axis SM machine. In some implementations, the providing 195 can include manufacturing a mold for a physical structure with the 2.5-axis subtractive manufacturing machine using the toolpath specification generated 195A, where the 3D model can be a model of the mold that will be manufactured using a 2.5-axis subtractive manufacturing process.

The 3D model that is provided 195 can be the 3D model produced 185 by a generative design synthesis method or a post-processed version of the generative design output. In some implementations, a polygon mesh, which can be extracted from the output by a boundary-based generative design process, or generative design data obtained directly from the boundary-based generative design process can be converted into a boundary representation (B-Rep) model and/or a parametric feature model, e.g., by CAD program(s) 116. For example, generative design data can be level-set distance field data obtained directly from the boundary-based generative design process. The boundary representation model or the parametric feature model can be editable as sketch geometry and parametric features. For example, in some implementations, a 3D mesh model produced by a generative design synthesis method can be converted into a watertight B-Rep 3D model, before being provided 195.

Thus, the generative design method(s) described in this document can be implemented, e.g., in CAD program(s) 116, to provide both (1) substantial user control over the generative design process, and (2) control functions for providing the generatively designed 3D model for use in manufacturing a physical structure corresponding to the object. In any case, the goal is to produce a 3D model of an object that facilitates 2.5-axis subtractive manufacturing of the object.

Figure 2A:
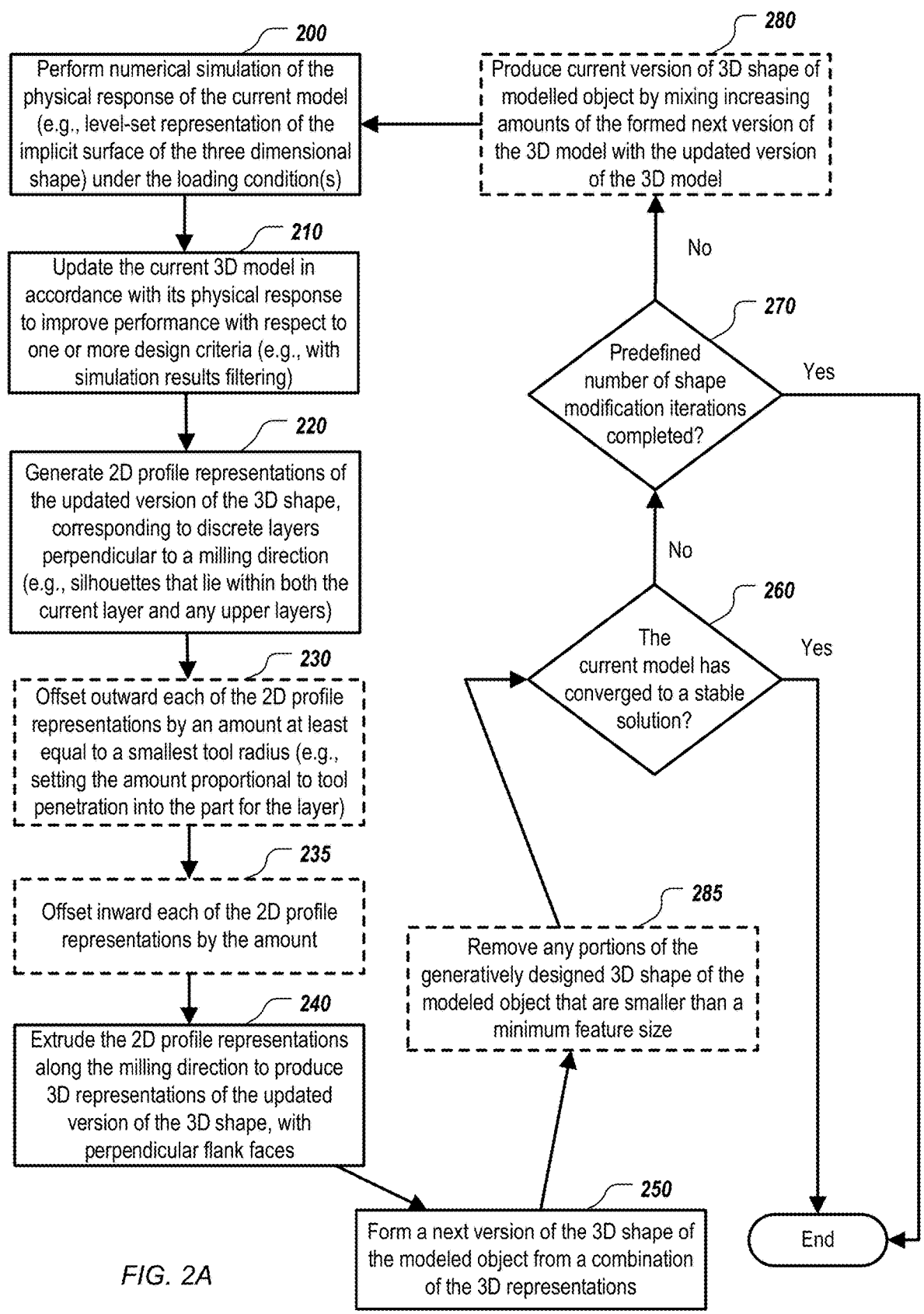
FIG. 2A shows an example of a process of generative design with geometry filtering to produce a 3D model compatible with a 2.5-axis subtractive manufacturing process.

FIG. 2A shows an example of a process of generative design with geometry filtering to produce a 3D model compatible with a 2.5-axis subtractive manufacturing process. The process of FIG. 2A is an example of the defined process 185 from FIG. 1B. Thus, the process of FIG. 2A involves an iterative modification of a generatively designed 3D shape, using a specified generative design process and based on inputs specifying the design space, a numerical simulation setup, and one or more design criteria, as detailed above. In some implementations, the shape synthesis process employs a boundary based (e.g., a level-set) method of shape optimization that begins with a starting shape or seed geometry, which is then modified through successive iterations of an optimization loop to produce an "optimized design" or "final outcome" that minimizes some quantity of interest (e.g., strain energy) subject to some constraints (e.g., mass, max stress, and manufacturability).

The shape optimization loop includes performing numerical simulation 200 of the modeled object in accordance with a current version of the 3D shape and the one or more in-use load cases to produce a current numerical assessment of a physical response (e.g., structural response) of the modeled object. As noted above, various types of numerical simulation can be performed. For example, an FEA simulation can compute strain energy everywhere inside the volume of the current version of the 3D shape. In any case, physics simulation of the current 3D shape produces a current numerical assessment that can then be used to change the 3D shape in view of the design criteria.

The current version of the 3D shape is then updated 210 based on the current numerical assessment of the physical response to produce an updated version of the 3D shape of the modeled object. In some implementations, the generatively designed 3D shape of the modeled object includes a level-set representation of an implicit surface of the modeled object, and the updating 210 includes updating the level-set representation in accordance with shape change velocities computed for the implicit surface based on the current physical assessment. For example, the strain energy field inside the volume (as determined by the numerical simulation) can be transformed into a velocity field on the surface of the volume, where the velocity at each point moves the geometry towards a more optimal shape, and the 3D shape can be advected to update the shape by moving each piece of the boundary according to its velocity.

Various types of updating 210 processes can be used. For example, the update 210 can include performing simulation results filtering, as detailed below in connection with FIGS. 3A-3C. Further, the 3D shape of the modeled object can be represented in different formats during different processing stages, such as representing the 3D shape using a grid of cubic voxels for simulation, using an implicit shape for shape update, and using a polygonal mesh for export of the generative design. Moreover, as noted above, the 3D shape of the modeled object can be required to stay within a specified design space (or design domain) throughout the optimization process, in which user specified regions of the design domain (called preserve bodies) are required to remain filled with material throughout the optimization process and can be used to specify boundary conditions on the physics problem (loads and constraints in solid mechanics, for example).

Figure 3A:
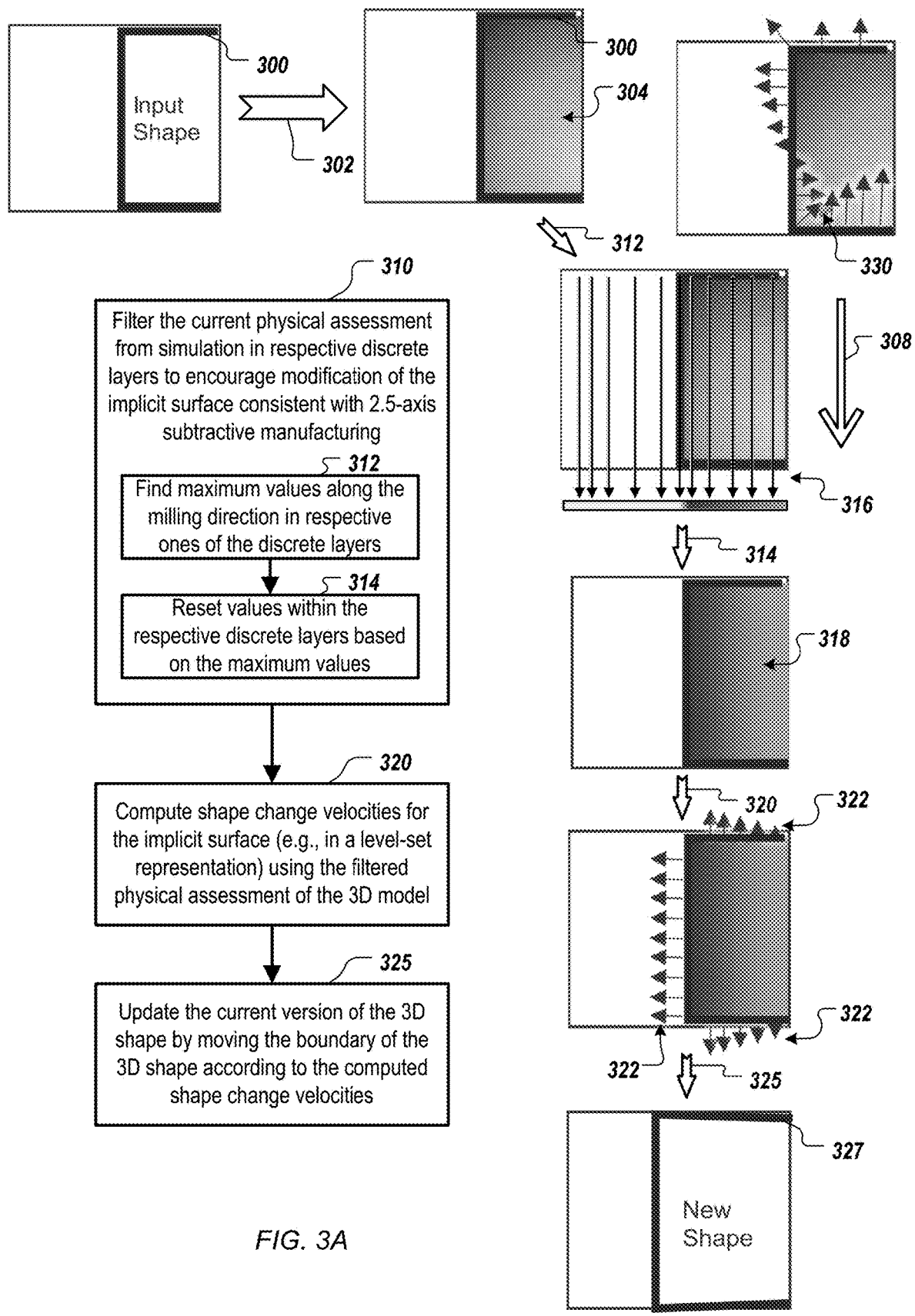
FIG. 3A shows an example of a process of simulation results filtering during generative design to encourage production of a 3D model compatible with a 2.5-axis subtractive manufacturing process.

FIG. 3A shows an example of a process of simulation results filtering during generative design to encourage production of a 3D model compatible with a 2.5-axis subtractive manufacturing process. An input shape 300 has been processed 302 using numerical simulation and a load case to produce a current numerical assessment 304 of physical response. In the example shown, the numerical assessment 304 of physical response is a strain energy field, but other types of physical assessments can also be used with the systems and techniques described herein.

The physics simulator can produce fields of stress, strain energy, etc. everywhere inside the modelled part, and a shape optimizer can translate this to a velocity field. This transformation from simulation field to velocity can be as simple as a scaling and offset of the field to achieve the desired volume reduction. But a traditional approach to shape optimization does not take into account a milling direction 308, so as to encourage production of shapes that are compatible with 2.5-axis milling. Thus, assuming that the initial shape is 2.5-axis millable, the velocity field produced by the optimizer will typically cause the shape to become less manufacturable because the simulation results do not indicate the objective is improved by moving in a 2.5-axis manufacturable direction.

To address this issue a 2.5-axis milling filter can be used between the physical simulation and shape optimization operations to filter the simulation results to produce a nearly-equivalent field that encourages the optimizer to move in a direction consistent with 2.5-axis manufacturing. The current numerical (physical) assessment 304 can be filtered 310 to produce a filtered physical assessment that encourages modification of the geometry of the implicit surface of the three dimensional shape consistent with the 2.5-axis subtractive manufacturing process during the updating of the 3D shape of the modelled object.

The filtering 310 can include filtering in respective discrete layers of the modelled object, e.g., as specified by a user or an automated process, but the example that is graphically shown in FIG. 3A is only of a single layer (this 2-axis example represents a special case of 2.5-axis with only one layer) for ease of illustration. The filtering 310 can include finding 312 (within respective ones of the discrete layers) maximum values in the current physical assessment (or potentially somewhat less than the maximum value, e.g., the $95^{th}$ or $90^{th}$ percentile value) along the milling direction 308, and resetting 314 values of the current physical assessment (within the respective ones of the discrete layers) based on the maximum values to produce the filtered physical assessment. For example, rays 316 can be cast through the part along the milling direction 308, and all voxels along each ray can be set to the maximum value of the field inside that layer, thereby creating a regularized field 318.

The current physical assessment can be voxel-based stress field data, strain field data or both. Note that "stress" and "strain" are tensors, for which "maximum" doesn't always have a good meaning. Thus, the filtering done on voxel-based stress field data or strain field data (or both) can be filtering performed on scalar quantities derived from such tensors (Von Misses stress and strain energy, for example). Note that other quantities can be used in place of these, and so in some implementations, different fields from simulation can be filtered.

In some implementations, rays are cast through the volume of the shape 300 along the milling direction 308, and the maximum value encountered along each ray is collected on a 2D plane normal to the milling direction 308 and passing through the part. Other approaches are also possible, such as accumulating using a different function (e.g., mean or median value, or using the $95^{th}$ or $90^{th}$ percentile value, rather than the maximum value) depending on the specific simulation result being filtered. Then, the simulation results are updated so that each voxel is set according to the nearest point on the plane. Thus, the finding 312 can include casting rays, which are parallel to the milling direction, through the current version of the three dimensional shape of the modeled object, within respective ones of the discrete layers, and collecting in respective two dimensional areas for the discrete layers a maximum value of the stress and/or strain data encountered along each of the rays, and the resetting 314 can include setting the stress and/or strain data in each voxel, within respective ones of the discrete layers, equal to the value in a location in the discrete layer's corresponding two dimensional area that is closest to the voxel. The closest point can be the point on the plane that is nearest to the 3D voxel center in the Euclidean sense. In some situations, a ray may not be cast at exactly this point, in which case linear interpolation can be used between the nearest points on the plane for which aggregate values from the raycasting are available. Moreover, further details regarding extending this approach to two or more layers are provided below in connection with FIGS. 3B & 3C.

With the filtered physical assessment 318 in hand, the current version of the 3D shape is updated in accordance with the filtered physical assessment, which can include computing 320 shape change velocities for the implicit surface (e.g., in a level-set representation) using the filtered physical assessment 318 of the current 3D shape of the modelled object. This computing 320 can use a traditional or a new shape optimizer algorithm, but in either case, because the numerical assessment from the simulation has been filtered so as to regularize the field with respect to the milling direction 308, and because the input to the shape optimizer is this regularized field 318, the computing 320 will generally produce shape change velocities 322 that are either parallel with, or perpendicular to, the milling direction 308, as shown in FIG. 3A.

The current 3D shape is then updated 325 by moving the boundary of the 3D shape according to the computed shape change velocities. As shown in FIG. 3A, the shape change velocities 322 are either parallel with, or perpendicular to, the milling direction 308. In light of this, a new shape 327 produced from the updating 325 is changed mostly in directions that maintain 2.5-axis machining compatibility. In contrast, note the many directions of shape change velocities 330, which would be produced by providing the original numerical assessment 304 of physical response to the shape optimizer rather than the filtered numerical assessment 318 of physical response; the multiple directions of the shape change velocities 330 would produce a new shape that is less compatible with 2.5-axis milling.

Further, as noted above, the filtering 310 can be performed in respective discrete layers of the modelled object, and these discrete layers can be specified by the user or by an automated process. FIG. 3B shows a graphical representation of simulation results filtering in respective discrete layers. The example shown in FIG. 3B is an input shape 350 that reside in three discrete layers 352, 354, 356, each of which are perpendicular to the milling direction 308. But this is just one example; different numbers of discrete layers 352, 354, 356 can be used, and one or more (or each) of the discrete layers 352, 354, 356 can have different thicknesses. As will be appreciated, the number of discrete layers 352, 354, 356 and the thicknesses thereof can be modified in various embodiments, by a user and/or an automated process, depending on the details of the input shape 350 and the shape and topology optimization to be performed.

In any case, the design domain (space) can be divided into discrete layers 352, 354, 356, and a strain energy field 360 can be generated for the input shape 350 using numerical simulation, as described above. The ray casting technique described above can then be performed for each respective discrete layer 352, 354, 356, such that rays are cast locally within each layer, and the maximum values along the cast rays are collected in a respective, separate 2D plane 362 for each layer. The values of the strain energy field 360 are then reset based on the collected maximum values to produce a regularized field 365, where the regularization is localized to each of the discrete layers 352, 354, 356.

Due to this localization of the input to the shape optimizer, the boundary velocities 370 computed for the shape 350 will be different in the respective layers 352, 354, 356, but will also still tend to produce a new shape 375 that is changed mostly in directions that maintain 2.5-axis machining compatibility. Thus, as shown, the new shape 375 includes flat sections that are perpendicular to the milling direction 308 at the transitions between the discrete layers 352, 354, 356, and the new shape 375 includes flat section that are parallel to the milling direction 308 between these transition planes. Note that the exposed top face(s) of the layers, and the bottom face(s) of the part, need not be addressed directly with regard to the effect of the shape change velocity. In some implementations, the geometry filtering corrects any unsuitable shape changes in these portions. However, in some implementations, the simulation results are assigned under the top/bottom faces to cause them to all move together, or to eliminate motion entirely by filtering the velocity field after shape change velocities have been computed.

FIG. 3C shows a graphical representation 390 of discrete layers within a modelled object. Consider an arbitrary voxel x inside the domain D with milling direction m. Without loss of generality, define a "base plane" B as the plane perpendicular to m which passes through the origin. Voxel x has a "height" from that plane as defined by $h(x)=\langle x, m \rangle$, or the projection of the vector from the origin to x onto the plane normal. Further, let $x_0 = x - \langle x, m \rangle m$ be the projection of x onto the base plane B. Layer boundaries are also specified (whether by the user or through an automated process) and take the form of a series of heights defining the boundaries above, below, and between the layers, $h_0, \ldots, h_n$, as shown in FIG. 3C.

Further suppose that the point x lies in layer l, with top and bottom heights $h_l$ and $h_{l+1}$, respectively, and a solver field $\psi$ is positive inside the part volume and zero outside. The regularized value of the field $\psi$ at the point x is defined as, $$\psi'(x) = \max_{h_l < t < h_{l+1}} \psi(x_0 + tm) \quad (4)$$

for all x with $h_0 \le h(x) \le h_n$, and $\psi'(x) = \psi(x)$ elsewhere. Note that this approach is applied before velocity computation, rather than after, and there need be no attempt to correct mis-aligned faces to bring the shape back closer to a manufacturable form, nor to minimize motion along the top and bottom faces of each layer. In practice, simulation result filtering/regularization is intended to help the optimizer push the shape in generally-manufacturable directions, but it will not in general be sufficient to maintain a 2.5-axis manufacturable shape. Thus, while the simulation result filtering/regularization process can be used without geometry filtering/regularization, typically this process is used in tandem with the geometry filtering/regularization as described below, or with another suitable technique that can correct non-constraint-compliant regions of the design.

Thus, the 3D shape produced by the updating 210 in FIG. 2A may not be compatible with 2.5-axis machining, either because the simulation result filtering/regularization (or other technique to push the shape optimization toward more manufacturable outcomes) does not ensure 2.5-axis milling compatibility, or because no simulation result filtering/regularization (or similar technique) is used. In such cases, additional processing can be performed (e.g., in each iteration of the optimization loop) after the update 210 to ensure the produced 3D shape is compatible with 2.5-axis machining and does not include invalid geometries for 2.5-axis machining.

Figure 2B:
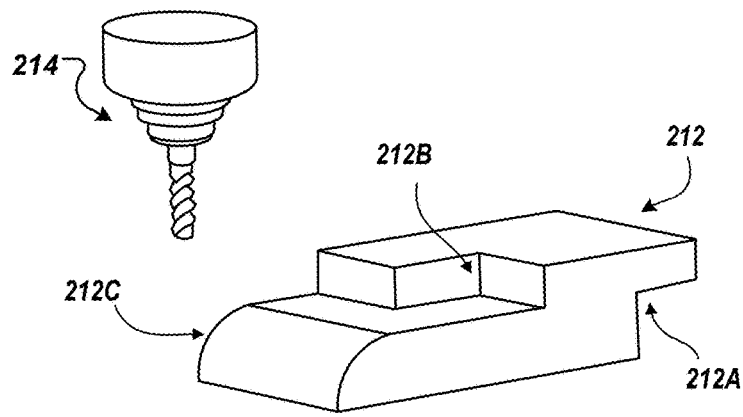
FIG. 2B shows examples of invalid geometries for 2.5-axis machining.

FIG. 2B shows examples of invalid geometries for 2.5-axis machining. As shown, a 3D model 212 includes an undercut region 212A (with respect to the milling direction shown graphically in the orientation of a machining tool 214), an unreachable corner region 212B (as determined by the drill and spindle sizes of the machining tool 214), and a non-flank face 212C. These are examples of invalid geometries for 2.5-axis machining because a shape that can be manufactured by 2.5-axis machining techniques should satisfy three geometric requirements: (1) each point on the body should be "visible" from the milling direction (i.e., no undercuts); (2) each point should be reachable by a tool of specified diameter (e.g., no square holes); and (3) each face should have its normal either parallel to the milling direction (top or bottom face) or perpendicular to the milling direction (a flank face). In addition, top or bottom faces should be aligned with a layer boundary to reduce the number of discrete vertical steps the 2.5-axis machining proceed need use.

By applying a series of transformations to the updated (e.g., advected) geometry of the 3D model, the 2.5-axis machining incompatible geometry is converted to a "nearest shape" with 2.5-axis machining compatible geometry, which then serves as both the outcome shown to the user and the starting shape for the next iteration. Returning to FIG. 2A, note that the optimizer that effects the update 210 need have no knowledge of these transformations that are performed during the topology optimization loop.

Two dimensional (2D) profile representations of the updated version of the 3D shape are generated 220. The 2D profile representations correspond to the discrete layers that are perpendicular to a milling direction of the 2.5-axis subtractive manufacturing process. In some implementations, the number and locations of the discrete layers are determined by user input. In some implementations, the number and locations of the discrete layers are determined by an automatic process that analyzes one or more starting 3D models, e.g., the input preserve bodies. In some implementations, the number and locations of the discrete layers can change through the course of the optimization process.

For example, the number and locations of the discrete layers can be controlled by the optimizer as an independent variable. In some implementations, the set of independent variables controlled by the optimizer is augmented by adding the locations of one or more of the discrete layer transition heights and/or top and bottom faces. The objective function can be differentiated with respect to these additional variables using the chain rule to determine the rate of change of the objective with respect to each height variable as a function of individual element sensitivities. This derivative can be used to update the layer height locations according to the optimization algorithm being used. One or more heuristics can be applied to allow two nearly overlapping layer heights (corresponding to a very thin layer) to automatically merge. Additional one or more heuristics can be employed to detect high variance among the element sensitivities contributing to a layer height derivative and trigger splitting of the layer height into two (i.e., inserting a layer).

Generating 220 the 2D profile representations can include generating each of the 2D profile representations for a corresponding discrete layer by determining a silhouette (e.g., an outline that circumscribes all or most of the body in the layer, depending on how the location of the boundary is constructed) of one or more portions of the updated version of the 3D shape that lie within (in 2D) both the corresponding discrete layer and any of the discrete layers above the corresponding discrete layer with respect to the milling direction. In some implementations, this involves (for each layer) casting rays along the milling direction through a level-set representation of the implicit surface from the top portion of the upper most discrete layer (i.e., the top of the part) down to the bottom portion of the current discrete layer. In some implementations, rays are cast only through the current layer, and a Boolean union between this silhouette and that of the layer above is then performed.

Figure 2C:
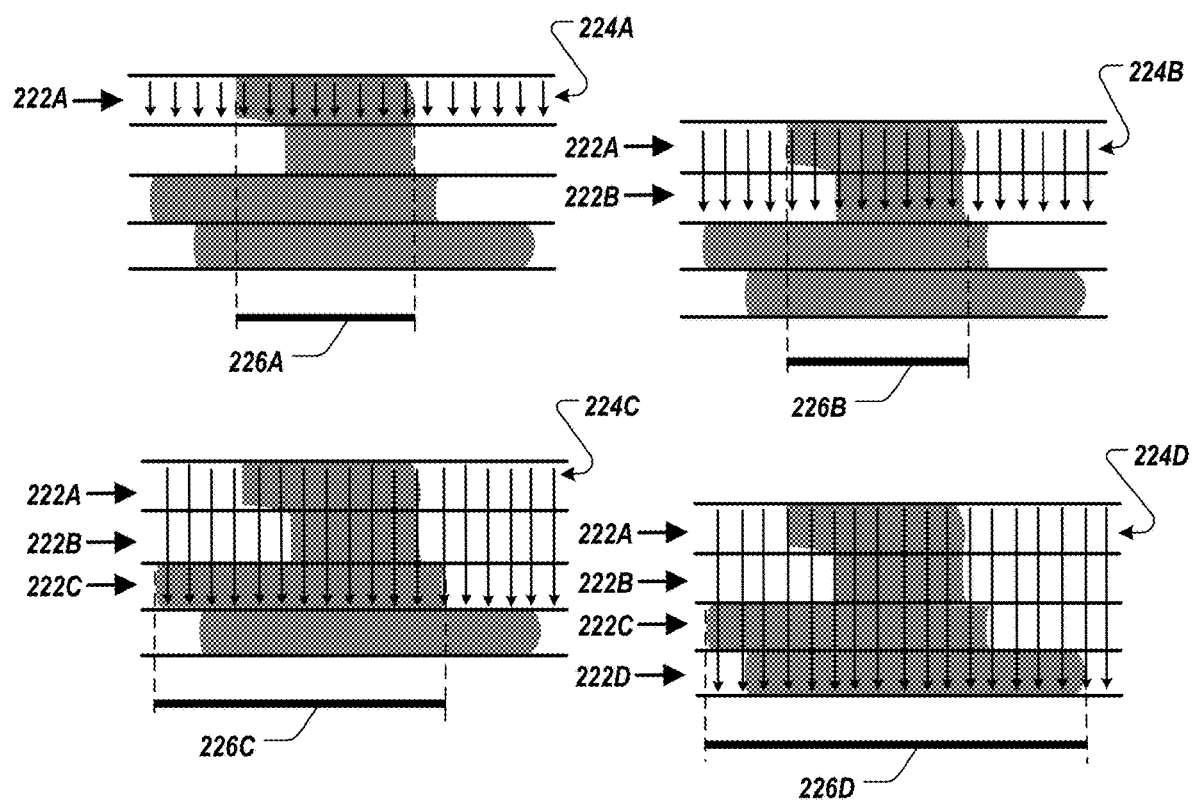
FIG. 2C shows a graphical representation of an example of generating two dimensional profile representations.

FIG. 2C shows a graphical representation of an example of generating two dimensional profile representations. Note that FIGS. 2C-2F represent cross-sectional views of the 3D part perpendicular to the milling direction to facilitate visual clarity in this disclosure. Similar in spirit to the simulation results regularization filter described above, rays can be cast through the volume to create a 2D slice or "silhouette" for each layer containing the largest envelope of the part in and above that layer. In the example shown in FIG. 2C, the current 3D shape of the modelled object spans four layers 222A, 222B, 222C, 222D. A first set of rays 224A are cast through the first layer 222A to produce a first layer silhouette 226A of the part. A second set of rays 224B are cast through the first and second layers 222A, 222B to produce a second layer silhouette 226B of the part. A third set of rays 224C are cast through the first, second and third layers 222A, 222B, 222C to produce a third layer silhouette 226C of the part. And a fourth set of rays 224D are cast through the first, second, third and fourth layers 222A, 222B, 222C, 222D to produce a fourth layer silhouette 226D of the part.

Mathematically, using the same terminology as above but this time casting rays through a level set field $\Phi$, where interior points are negative and exterior points are positive, to produce a 2D field containing a level set of the silhouette for layer l, $\phi_l$. For convenience, let all layer silhouettes be coplanar with the base plane.

$$\phi_l(x_0) = \min_{h_0 < t < h_{l+1}} \Phi(x_0 + tm) \quad \forall x_0 \in (\phi_l) \quad (5)$$

Practically, $\phi_l$ is selected to be large enough to contain the shadow of the entire body, then Equation (5) is used on each pixel in the plane to create the 2D silhouette projection. Note that unlike Equation (4), the aggregation uses min(·) and rays are cast from the top of the part down to the bottom of layer 1 (instead of just within the layer). Because the rays start at the top of the volume, undercuts are automatically filled-in in the layer silhouettes.

Note however that using the largest/maximum envelope of the part in and above the current layer is not required, and other approaches can be used to define the extent of the silhouettes 226A, 226B, 226C, 226D, i.e., where to put the vertical walls of the flank faces. In some implementations, the boundaries of the silhouettes 226A, 226B, 226C, 226D are defined by the average of the edges that are associated with the part in and above the current layer. In some implementations, the boundaries of the silhouettes 226A, 226B, 226C, 226D are defined by a weighted average of the edges that are associated with the part in and above the current layer. Other variations are possible, i.e., different mappings from the unconstrained design to the constrained 2.5-axis compatible design, e.g., using the 75$^{th}$ percentile or the median value, depending on how rapidly the generative design process should remove material, and the potential risk of undesirably disconnecting two pieces of the body, which are held together by a web that is comparatively thin in the milling direction. Thus, in the case of checking the values of the signed distance field along the ray, rather than picking the boundary as the minimum signed distance field value that is encountered, i.e., this innermost encountered point and that creates this exterior envelope, the math can be readily changed to use a different aggregation, e.g., aggregate on average.

Returning to FIG. 2A, the 2D profile representations are extruded 240 along the milling direction to produce 3D representations of the updated version of the three dimensional shape. Note that because the 2D profile representations are extruded 240 along the milling direction, the resulting 3D representations necessarily have flank faces parallel to the milling direction (each normal of each flank face is perpendicular to the milling direction). Then, a next version of the 3D shape of the modeled object is formed 250 from a combination of the 3D representations having flank faces. For example, performing a Boolean union of the 3D representations produces a new 3D shape that has been modified from the prior iteration to better satisfy the design criteria of the generative design process, but the new 3D shape necessarily has no undercuts and no faces that are not either top or bottom faces (with normal parallel to the milling direction) or flank faces (with normal perpendicular to the milling direction).

Figure 2D:
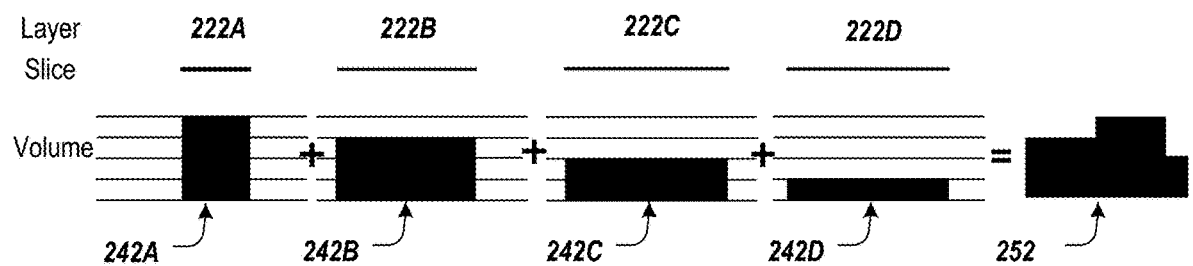
FIG. 2D shows a graphical representation of 2D slices projected back to 3D extrusions and combined to form a combined geometry for a modelled object.

FIG. 2D shows a graphical representation of an example of the extruding 240 and forming 250, from FIG. 2A, using the example of layer silhouettes from FIG. 2C. For each layer 222A, 222B, 222C, 222D, the corresponding 2D slice can be projected back to a 3D extrusions, and these 3D extrusions 242A, 242B, 242C, 242D can be combined to form a combined geometry 252 for the modelled object. In some implementations, the 3D level-set field is reconstructed by projecting the 2D slices. To do this, each slice is used to construct a 3D extrusion representing the layer and its shadow, and these extrusions are combined using a Boolean union to produce the combined shape.

Mathematically, define $\Phi_l$, the 3D extrusion of layer l, and the final regularized shape, $\Phi'$, as follows:

$$\Phi_l(x) = \max(\bar{\phi}_l(x_0), h_l - h(x), h(x) - h_n) \quad \forall l = 1 \ldots n \quad (6)$$

$$\Phi'(x) = \min_l \phi_l(x)$$

where $x_0 = x - \langle x, m \rangle m$ is the projection of x onto the base plane B, and $h(x) = \langle x, m \rangle$ is the height of point x above the base plane B shown in FIG. 3C. The second two arguments in the first line create the top and bottom faces of the extrusion, respectively. This new geometry satisfies the requirement that all faces with normal parallel (or antiparallel) to m lie on layer boundaries, and all remaining faces have normal perpendicular to the layer boundaries.

In some implementations, the regularized field $\Phi'$ replaces the input field $\Phi$ as the output of the optimization in every iteration. In some implementations, the geometry filter can be more slowly introduced, allowing the optimizer some period of unconstrained optimization and then gradually adding in the constraint by mixing the input and output fields using a mixing constant $s \in [0,1]$, $$\Phi_{out} = (1-s)\Phi + s\Phi' \quad (7)$$

and allowing s to be 0 at the beginning of the optimization process, then slowly ramping it up to 1 (linearly, or following any other continuous 0-1 function). This may require reinitializing $\Phi'$ and $\Phi$ to be signed distance fields in a narrow band at least as large as $\max(\text{abs}(\Phi(x) - \Phi'(x)))$.

Returning to FIG. 2A, a check 260 can determine whether or not the current model has converged to a stable solution, i.e., all design constraints are satisfied and only minor changes were made to the 3D shape of the modelled object since the last iteration because the balance of design objectives cannot be much further improved subject to the constraints. Further, in some implementations, a check 270 can determine whether or not a predefined number of shape modification iterations have been completed, such that the iterative modification process will end after a predefined number of iterations (specified by the user or by an automated process). In general, the performing 200 of the numerical simulation, the updating 210 of the current 3D model, and the other operations in the iterative loop (e.g., the generating 220, the extruding 240, and the forming 250) are repeated until a predefined number of shape modification iterations have been performed, the generatively designed three dimensional shape of the modeled object in the design space satisfies the one or more design criteria and the one or more in-use load cases, or both.

Moreover, as noted above, the geometry filter can be introduced slowly over the course of the iterative modification of the 3D shape during the topology optimization process. Thus, in some implementations, the iteratively modifying includes producing 280 the current version of the 3D shape of the modelled object (for a next iteration) by mixing increasing amounts of the formed 250 next version of the 3D model with the updated 210 version of the 3D model. For each of multiple iterations, the current version of the 3D shape of the modeled object can be produced by mixing the next version of the 3D shape from a prior iteration (the immediately prior version and/or a prior version before this) with the updated version of the three dimensional shape from the prior iteration. Further, an amount of the next version used in the mixing can increase relative to an amount of the updated version, for each of two or more subsequent ones of the multiple iterations (e.g., for each subsequent one, or potentially with some intervening iterations with a temporary decrease in the mixing ratio) until none of the updated version and all of the next version is used as the current version of the 3D shape of the modeled object in a next iteration of the modifying. Thus, early in the optimization loop, the optimizer can be allowed to operate with little or no constraint from the geometry filtering, with or without the simulation results filtering, and then later on in the optimization loop the geometry filtering can be added in (either gradually over multiple iterations or all at once) to ensure the final output geometry is compatible with 2.5-axis milling.

Figure 4A:
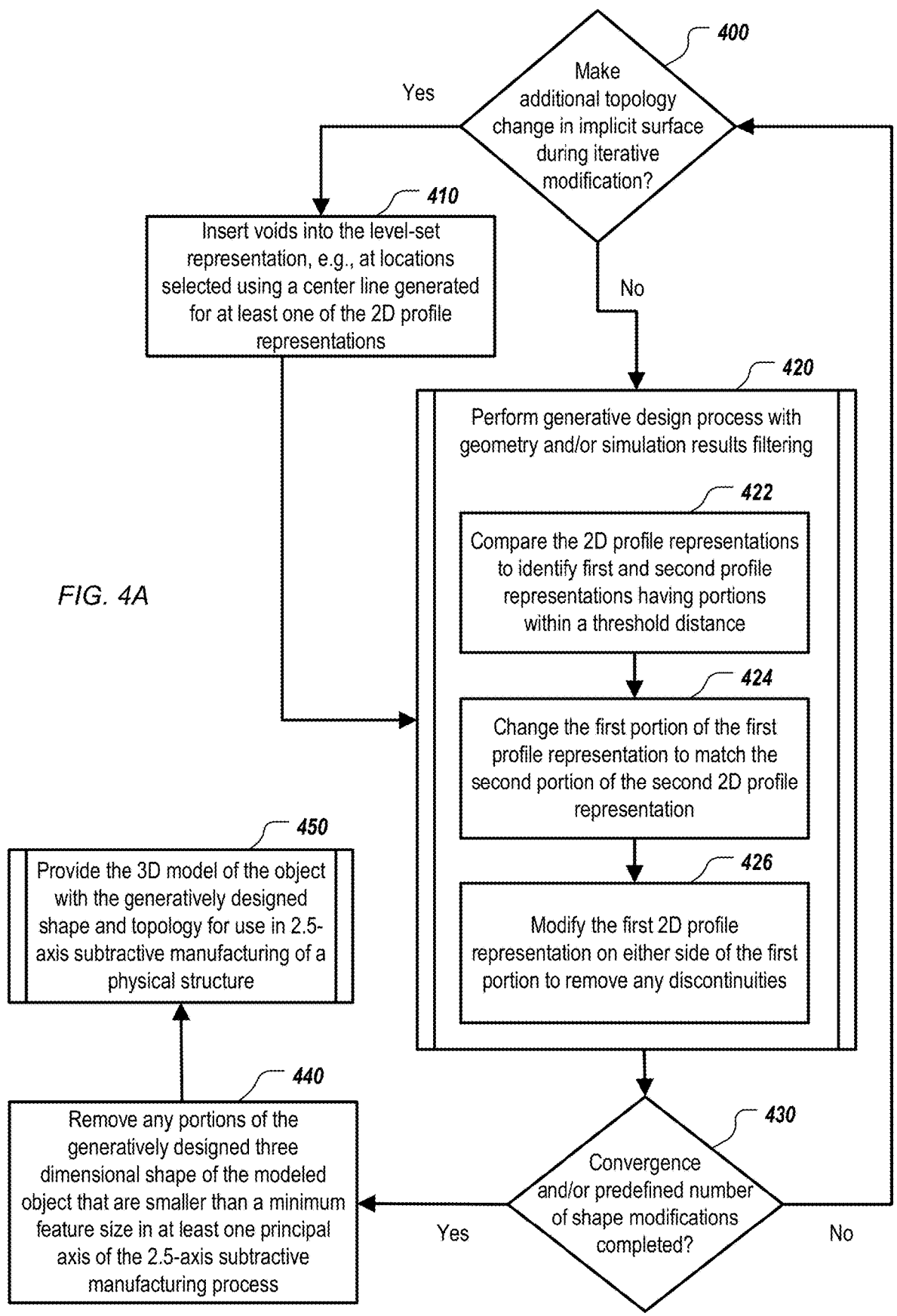
FIG. 4A shows additional process examples for generatively designing a part using geometry filtering, simulation results filtering, or both, to produce a 3D model compatible with a 2.5-axis subtractive manufacturing process.

In some implementations, any portions of the generatively designed three dimensional shape of the modeled object that are smaller than a minimum feature size are removed 285 in at least one principal axis of the 2.5-axis subtractive manufacturing process. Further details regarding such removal of small features are provided below in connection with FIG. 4A. Note that the removal 285 can be done (i) during the iterative modification of the shape (i.e., as a step in the optimization loop, where the next version of the 3D shape of the modeled object has any slivers of geometry removed) as shown in FIG. 2A, (ii) after the iterative modification of the shape (i.e., as a post-process after the optimization is complete) as shown in FIG. 4A, or (iii) both during the iterative modification and after the iterative modification.

In addition, in some implementations, in order to ensure that a round milling tool can cut the profile contained in the 2D layer silhouette, a morphological closing operation is performed. This operation can be performed directly on each 2D layer silhouette to ensure tool accessibility. Thus, in some implementations, each of the 2D profile representations is offset outward 230 by an amount that is at least equal to a radius of a smallest milling tool available for use with one or more computer-controlled manufacturing systems to be used to manufacture the physical structure for the modelled object. And subsequent to this outward offsetting 230, each of the 2D profile representations is offset inward 235 by the amount that is at least equal to a radius of a smallest milling tool available. These offsets 230, 235 to form an accessible profile for each layer should be done before the extruding 240 and forming 250. Further, in some implementations, the amount of the offset is set based on (e.g., proportional to, or non-linearly related to) the tool penetration into the part that will be needed for milling the layer, e.g., the offsetting 230 can include setting 230 the amount for offsetting a 2D profile representation for one of the discrete layers based on a difference between a height of a bottom portion (with respect to the milling direction) of the one discrete layer for the 2D profile representation and a height of a top portion of the part (with respect to the milling direction). Note that using this dynamic adjustment of the tool size, as the depth of cut increases, improves manufacturability by avoiding the need for expensive and fragile tools which are very long and slender.

Figure 2E:
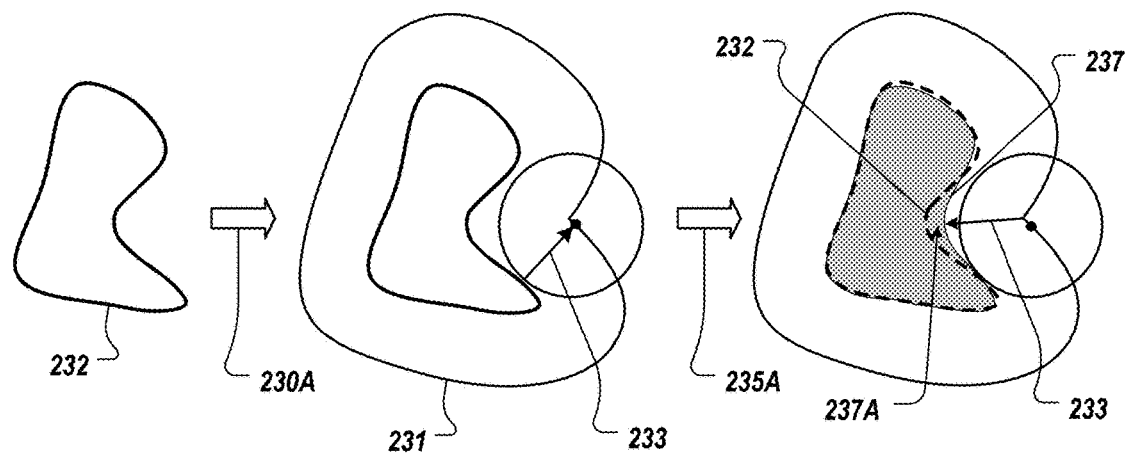
FIG. 2E shows a graphical representation of a morphological closing for tool access.

FIG. 2E shows a graphical representation of a morphological closing for tool access. As shown, the morphological closing can involve a curve offset 230A applied to an input profile 232, where the amount of the offset 230A is equal to a tool radius 233; this creates something like a tool path 231 used to cut this layer of the geometry. This offset curve 231 is then offset again 235A by the same amount 233 back towards the original profile 232, producing an updated profile 237 which is identical to the original except that geometry 237A is added to corners too tight for the tool to access.

Mathematically, morphological closing produces the accessible 2D layer silhouette for layer l (denoted $\bar{\Phi}_l$) from the ray cast 2D layer silhouette produced above, according to $$\bar{\Phi}_l = \text{init}(\text{init}(\phi_l) + d_l) - d_l \qquad (8)$$

where the init(·) function is a signed distance field reinitialization procedure. Thus, this morphological close effects a tool access check that effectively adds material to the part to ensure it is accessible during milling. Therefore, each point is reachable by a tool of specified diameter or radius (e.g., no square holes).

In 3- and 5-axis milling, the tool accessibility checks incorporate a model of the tool head to ensure that a tool of the user-specified length can be used to cut the part. Doing this in 2.5-axis can create unwanted shelves where the head interferes with the body. So rather than assuming an infinitely long tool, which can require the machinist to special-order tools at great cost, a dynamic tool selection approach can be adopted, which assumes that only the fluted sides of the tool enter the part bounding box, and then an appropriately sized tool is selected so the part can be cut with inexpensive, readily-available end mills.

Figure 2F:
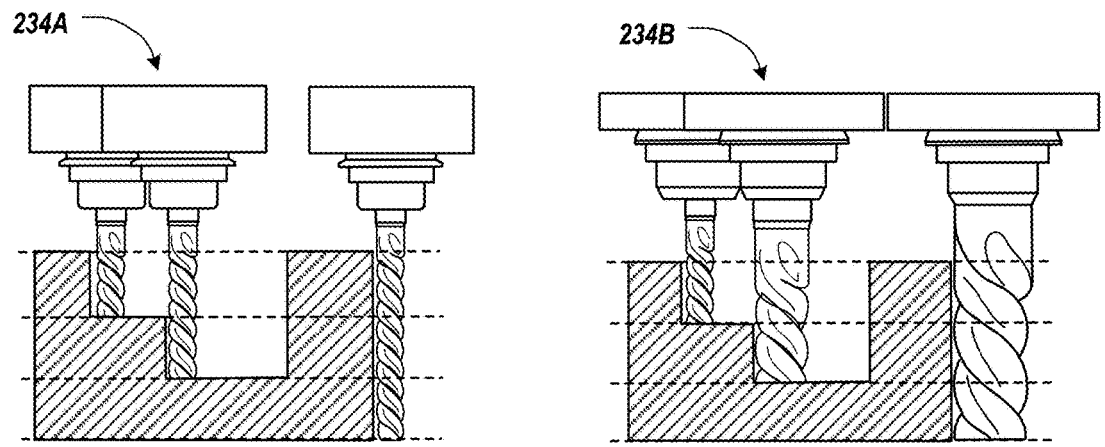
FIG. 2F shows a graphical representation comparing tool modelling approaches.

FIG. 2F shows a graphical representation comparing tool modelling approaches. In tool modelling approach 234A, a fixed diameter, infinitely long tool is assumed. As noted above, this may be unrealistic or result in expensive tooling requirements. In contrast, in tool modelling approach 234B, the tool diameter grows with planned cutting depth. In some implementations, the user (or an automated process) supplies a minimum tool size, which acts as a lower limit for the tool selected for each layer. The tool diameter, $d_l$, to be use for a layer l, can be defined according to, $$d_l = \max\left(d_{min}, \frac{h_{l+1} - h_0}{2}\right) \quad (9)$$

where $d_{min}$ is the user-specified minimum diameter and $h_0$ is the height of the top plane of the part (plane closest to the tool holder). Thus, setting the amount for offsetting can include setting the amount to the maximum of (i) the radius of the smallest milling tool available and (ii) a predefined fraction of the difference between the top of the part and the bottom of the layer to be machined, the predefined fraction being greater than zero and less than one (or greater than one in some cases). In the example above, the predefined fraction is one half, but other predefined fractions are also possible and can be tailored to the particular machine tool with which the part is expected to be manufactured. Note that this approach introduces the undesirable side effect of the corner radius being different at different height levels, creating thin shelves in the designed part, but these artifacts can be handled using a layer alignment technique described below in connection with FIGS. 4A & 4B.

In addition, the difference need not be between $h_{l+1}$ and $h_0$, i.e., setting 230 the amount for offsetting a 2D profile representation for one of the discrete layers need not be based on a difference between a height of a bottom portion (with respect to the milling direction) of the one discrete layer for the 2D profile representation and an upper most discrete layer of the part (with respect to the milling direction); other measures of cutting penetration depth are possible. Note that the h values here refer to the layer transitions heights, the distance along the milling direction from the exterior of the part at which one layer ends and the next begins, rather than the layer heights themselves, which can be associated with the height of the mid-plane of the layer; if there are N layers, there are N+1 layer transitions, the first of which is the top of the part and the last the bottom of the part as measured along the milling direction.

In some implementations, the silhouette offset amount is a function of the distance between the very top of the part and the next-deepest layer transition (i.e., the bottom of the current layer), with respect to the milling direction. Thus, the distance is measured from the top most layer transition to the bottom of the current layer, corresponding to the maximum possible depth of cut. And in some implementations, the silhouette offset amount is a function of the distance between the top of the part locally and the next-deepest layer transition. Thus, the distance is measured from the top of the part locally in the region where the currently modelled cutting will occur (i.e., if there's no material on the top layer in a particular region, we don't include it in the assessment). Other measures of the cutting penetration depth are also possible.

In some implementations, setting the amount for offsetting includes setting the amount to the maximum of (i) the radius of the smallest milling tool available and (ii) the diameter selected for a "realistic milling tool", which should have flutes that engage the full depth of the cut. This selected diameter can be drawn from a table or database of available milling tools, either specific to the user or generally applicable to the process (such as an industry-standard tool catalog). In some implementations, the diameter is determined by an equation-driven relationship between the flute length and tool diameter drawn from expert knowledge of typical end mill characteristics. For example, the equation-driven relationship between flute length and tool diameter can use a fixed positive tool aspect ratio, e.g., the one half ratio of Equation (9), or more generally, rather than using 2 in the denominator of Equation (9), a variable rt is used instead, where the value of rt is selected to describe typical inexpensive milling tools.

FIG. 4A shows additional process examples for generatively designing a part using geometry filtering, simulation results filtering, or both, to produce a 3D model compatible with a 2.5-axis subtractive manufacturing process. The process of FIG. 4A can be implemented in combination with any of the processes described above in connection with FIGS. 1B-3C. In the case of boundary-based generative design processes, such as those using a level-set representation, holes or voids can be added and removed during the iterative modification process in order to change the topology of the generative design, or the topology of one or more individual layers. The removal of holes/voids can be implemented based on a hole/void becoming smaller than a threshold size as a result of the shape modification process, e.g., the holes/voids can be removed automatically (as a result of the offset) when they shrink to a size that is smaller than the tool radius. Further, holes/voids can be added during the iterative modification process periodically or as needed.

Thus, a check 400 can be performed during the iterative modification process to determine if an additional topology change should be made in the implicit surface of the current version of the 3D shape. In some implementations, the check 400 is whether a predefined number of iterations have occurred. In some implementations, the check 400 involves analyzing the current data (e.g., the current simulation results or current rate of change of the shape during the optimization procedure) to see if this data indicates that the shape would benefit from a topology change. If a topology change is indicated, then the implicit surface used in the boundary-based generative design process is modified to insert at least one void. In some implementations, one or more voids are inserted 410 into a level-set representation of the 3D shape, e.g., at locations selected using a center line generated for at least one of the 2D profile representations. Further details regarding this insertion 410 are provided below in connection with FIGS. 4C-4E. In some implementations, each of the layers are evaluated to see whether a void can be safely inserted into any of the layers, where a void insertion is "safe" if the void created does not get too close to the exterior profile of the layer (it needs to be completely contained by geometry), and the void is a reasonable distance from the profiles of layers above/below the layer in question (to avoid a hole cutting across a vertical wall).

In any case, a generative design process is performed 420 repeatedly until a check 430 indicates convergence and/or completion of a predefined number of shape modifications. The generative design process can be any of the generative design processes described above, and can also include a layer alignment process, e.g., to remove undesirable differences in corner radius on two layers, which could otherwise overlap, resulting from setting the offset amount based on (e.g., proportional to, or non-linearly related to) the tool penetration into the part. Thus, the 2D profile representations can be compared 422 to identify at least a first profile representation above a second profile representation (with respect to the milling direction) where a distance between a first portion of the first profile representation and a second portion of the second profile representation is below a threshold distance.

When any such first and second profile representations (having portions within a threshold distance) are identified, the first portion of the first profile representation can be changed 424 to match the second portion of the second profile representation, and the first profile representation on either side of the first portion can be modified 426 to remove any discontinuities in the first profile representation resulting from the changing. This layer alignment effectively snaps adjacent layers together to produce more functional designs, improving the quality of the generative design results obtained, making results easier to edit in down-stream processes, and reducing CAM programming and machining time. Note that this layer alignment technique is also useful in implementations that do not include setting an offset amount based on (e.g., proportional to, or non-linearly related to) the tool penetration into the part.

Even though the tool can efficiently cut a tiered structure, unnecessary shelves between layers introduce stress concentrators, manual finishing steps such as breaking edges, and aesthetic concerns. Thin shelves can arise in the shape synthesis process because the solver has no reason to avoid them, irrespective of whether or not the dynamic tool selection process causes radii to change as the depth increases, introducing additional shelves in tight corners. Thus, aligning layers on adjacent profiles is generally desirable to ease editing and programming tasks, reduce stress concentrators, manual finishing steps, and aesthetic concerns.

To address thin shelves, adjacent layers can be aligned to produce a smooth flank face whenever they are sufficiently close together by adding material to the upper layer. To do this, the stack of layers can be traversed from bottom to top (where top is closest to the spindle). For each pixel on the signed distance field of each layer silhouette, the approximate distance between the profile can be computed as the difference between the current layer's signed distance value and the value of the corresponding pixel on the layer below.

If the profile distance is smaller than a specified tolerance, the current layer can be moved to line up exactly with the layer below by setting the current pixel's signed distance value to match that of the layer below. This creates discontinuities in the top layer's profile where it transitions between corrected and uncorrected regions, and a smooth transition between the corrected and uncorrected boundary is used instead. Given a constant transition start distance $t_1$ and transition end distance $t_2$ where profiles closer than $t_1$ line up perfectly, and profiles farther than $t_2$ remain unchanged, the signed distance value for pixel v can be updated given a corresponding signed distance value from the layer below $\bar{v}$ according to $$t = \frac{v - \bar{v} - t_1}{t_2 - t_1} \quad (10)$$

$$v' = \begin{cases} \bar{v} & \text{if } v - \bar{v} \leq t_1 \\ tv + (1-t)\bar{v} & \text{if } t_1 < v - \bar{v} < t_2 \\ v & \text{if } v - \bar{v} > t_2 \end{cases}$$

where the interpolant t manages the transition between the fully-aligned and no-change portions of the profile. Layer alignment allows pockets to span multiple layers without introducing thin shelves.

Figure 4B:
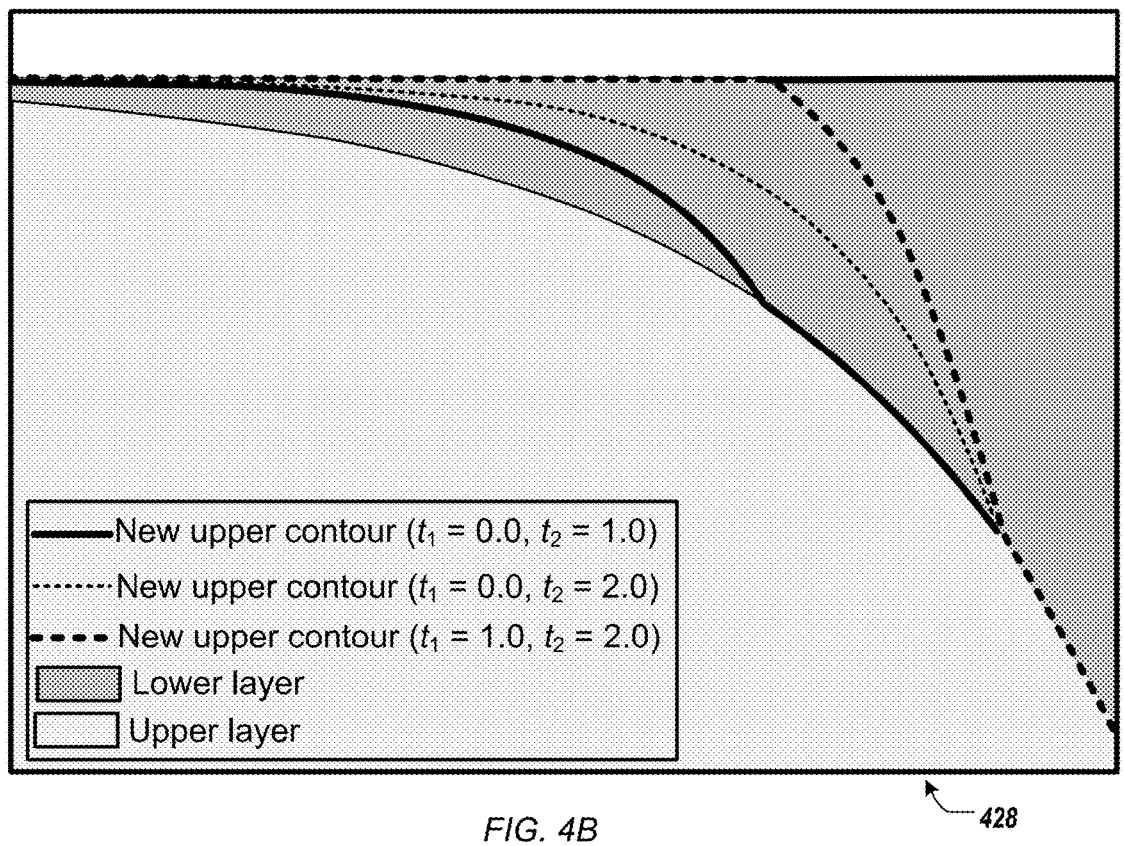
FIG. 4B shows an example of the influence of layer alignment parameters on removing discontinuities resulting from changing a first layer profile to match a second layer profile.

FIG. 4B shows an example 428 of the influence of layer alignment parameters on removing discontinuities resulting from changing a first layer profile to match a second layer profile. As shown, various new upper contours can be created (for the upper layer over the lower layer) depending on the values of $t_1$ and $t_2$. In this example, the values are ($t_1$=0.0, $t_2$=1.0); ($t_1$=0.0, $t_2$=2.0); and ($t_1$=1.0, $t_2$=2.0). Other values are possible and will still result in the removal of any discontinuities. In practice, the signed distance field difference v-$\bar{v}$ is sometimes slightly noisy away from the boundary, producing irregular output profiles after the interpolation of Equation (10). Thus, in some implementations, the weights t are computed across all voxels, then Gaussian blurred, before interpolating.

Returning to FIG. 4A, in some implantations, after the iteratively modifying 420 and before providing 450 the 3D model, any portions of the generatively designed three dimensional shape of the modeled object that are smaller than a minimum feature size can be removed 440 in at least one principal axis of the 2.5-axis subtractive manufacturing process. Occasionally, thin slivers of material appear in synthesized shapes, e.g., caused by collapsing profiles or by obstacles placed inside a layer (obstacles are regions excluded from the design domain by the user). These slivers of material are little fragments of geometry that technically adhere to the requirements for 2.5-axis machining detailed above, but are not in fact manufacturable in practice, and so should be removed, preferably by an automated process rather than manually. Note that the minimum feature size can be specified by the user or by an automated process. In addition, as noted above, the removal 440 can be done inside the iterative loop of the generative design process 420.

In some implementations, voxels from the interior of the domain of the final 3D geometry are removed when the two neighbor voxels along one of the principle axes are both outside the domain. In some implementations, regions of the 2D layer slices which are thinner than a specified size are removed. Thin sections in a given test profile can be identified by performing a morphological opening (i.e. perform an inward offset, renormalize the signed distance field, then perform outward offset of the same amount), then searching for regions in the opened version of the profile which are significantly different from the original shape. In particular, differences of magnitude less than the opening distance correspond to fine details on the surface of the otherwise-large profile, whereas differences of magnitude greater than the opening distance correspond to regions of the design which are significantly thinner than twice the opening distance. This test can be performed on each 2D layer, and also on each 2D layer subtract one or more obstacles which intersect that layer, and the regions identified as too thin can be removed from the 2D layer before constructing the final 3D geometry.

In some implementations, regions of the 2D layer slice which have small area are removed. Regions of small area can be identified by converting the level set field of the 2D layer into a Boolean (black-and-white) representation of the shape, in which a connected components or flood fill algorithm can be used to identify regions of pixels in the 2D layer which are contiguous. Regions which are too small are identified as groups of contiguous voxels which have area less than a specified threshold, and are removed from the 2D layer profile using Boolean subtraction or other means. As above, this test is performed on the 2D layer profile, and optionally also on the 2D layer profile with one or more intersecting obstacles removed by Boolean subtraction and the modified 2D layer profile is used to construct the final 3D geometry.

But regardless of the specific approach used, sliver removal eliminates small extruded regions from the results, thus improving the quality of the final generative design results. Once this or other post processing is completed, e.g., conversion of the 3D model to another computer modelling format, the 3D model of the object with generatively designed shape and topology is provided 450 for use in 2.5-axis subtractive manufacturing of a physical structure. This providing 450 can include any of the details described above in connection with FIG. 1B for providing 195.

In addition, as noted above, the generative design process can include generating and inserting 410 voids into a boundary-based representation (e.g., a level-set representation) of the 3D shape of the modelled object being generatively designed. The geometry filtering can ensure a 2.5-axis manufacturable result, e.g., at each iteration of the optimization loop, but this filtering can also limit the active surface of the part in which the optimizer can make changes to the flank faces, which can slow convergence and reduce the quality of the generative design outcomes. To address this, a void generation operation (e.g., in the geometry filter) can introduce holes in the interior of the part, away from existing flank faces, to provide the optimizer with new surface area to manipulate. This allows the final design to include pockets, even if the starting shape does not, enabling more optimal outcomes. It can also accelerate convergence because more material can be removed on each iteration from the larger active surface area.

Figure 4E:
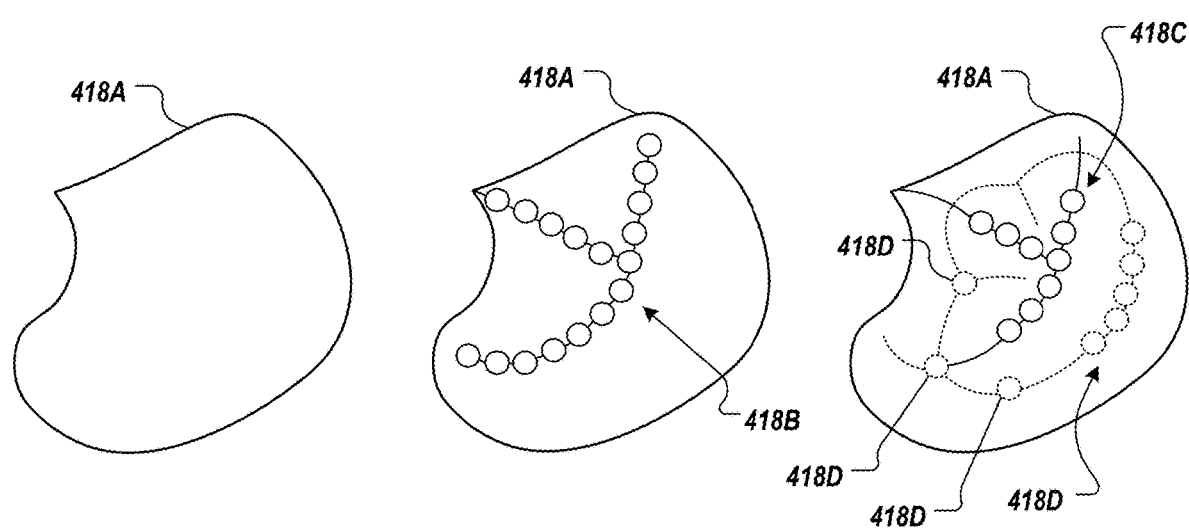
FIG. 4E shows an example of the effect of dividing void generation over multiple passes.
Figure 4C:
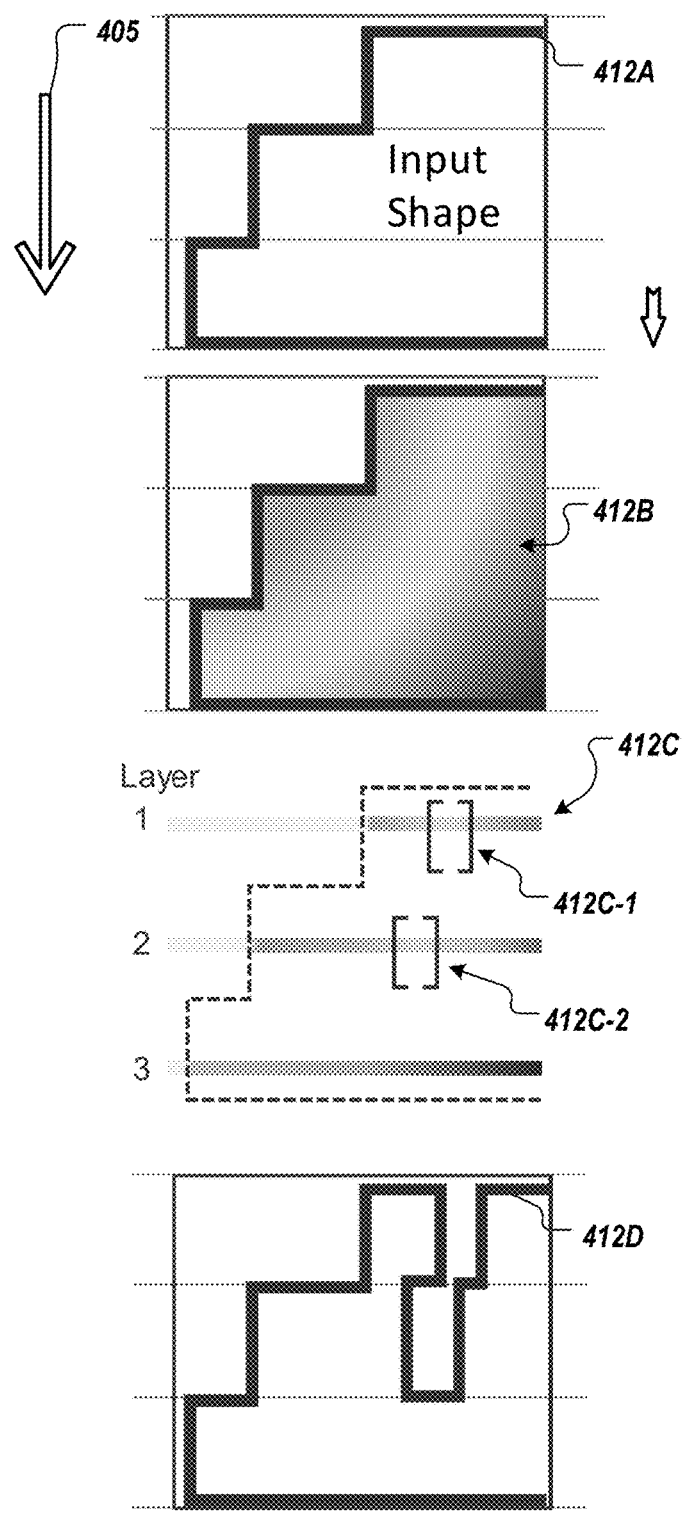
FIG. 4C shows an example of generating and inserting voids, e.g., into a level-set representation of a 3D shape.

FIG. 4C shows an example of generating and inserting voids, e.g., into a level-set representation of a 3D shape. This example is based on using the Von Misses stress field from the numerical simulation, but other outputs from the numerical simulation can also be used in various embodiments, e.g., some scalar quantities provided by the numerical simulation, which values can be converted into surface velocities. The example of FIG. 4C is similar in concept to the Bubble Method of classical level-set topology optimization, and introduces voids in regions of the part where a field computed from solver results (stress, strain energy, topological derivative, etc.) is below a certain threshold (whether a percentile or an absolute quantity), but this method is adapted to the 2.5-axis manufacturing requirement.

As in the example of FIG. 3B, an input shape 412A reside in three discrete layers, each of which are perpendicular to a milling direction 405; different numbers of discrete layers can be used, and one or more (or each) of the discrete layers can have different thicknesses. Further, a Von Misses stress field 412B can be generated for the input shape 412A using numerical simulation, as described above. The ray casting technique described above can then be performed for each respective discrete layer, such that rays are cast locally within each layer, and the maximum values along the cast rays are collected in a respective, separate 2D plane for each layer. Thus, the simulation results field 412B (e.g., the Von Misses stress) is projected, per layer, onto respective 2D slices 412C.

Regions 412C-1, 412C-2 of each slice 412C that are below a threshold value are removed from the 2D silhouettes, which thus creates voids in the projected 3D volume that produces a new shape 412D. The threshold used can be a percentile of the global stress field, or derived through some other means. The resulting shape 412D now contains undercuts, but this can be corrected either by extending embedded voids up through all layers above or removing the voids where there is material above them; thus, the seeding is of cylinders (with sides that are parallel with the milling direction) rather than bubbles. The resulting shape may also introduce pockets which are inaccessible by the chosen tool. To ensure results are acceptable, the void generation operation 410 can be placed before the tool access operation 230, 235 in the geometry filter, which may cause the tool access to fill in some of the generated voids.

Figure 4D:
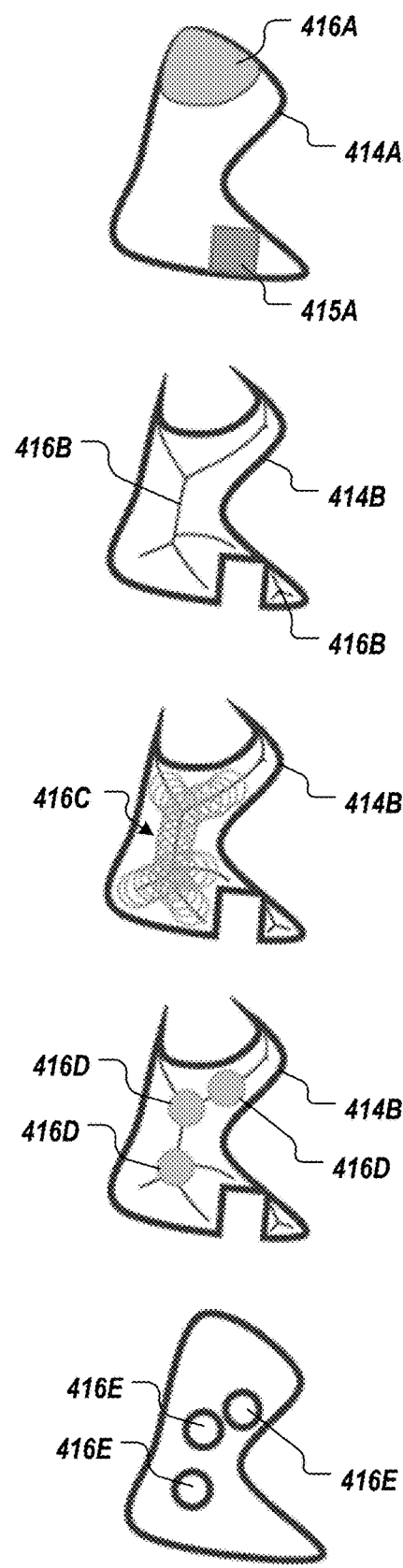
FIG. 4D shows another example of generating and inserting voids, e.g., into a level-set representation of a 3D shape.

FIG. 4D shows another example of generating and inserting voids, e.g., into a level-set representation of a 3D shape. This example is based on using shape skeletons. Rather than using solver fields in selecting void locations, shape skeletons can be used to figure out where to place cylindrical voids extending one or more layers down into the part until a specified volume of voids has been created. In some implementations, circular voids equal to or larger than the tool diameter (e.g., larger by 5% to 75%, and in some implementations, 50% larger than the tool diameter) can be placed at regular intervals along the shape center line until a pre-determined volume of the part has been removed ("target void volume"; which could be fixed in advance, specified by the user, or adjusted dynamically as convergence is reached). The target void volume should be selected so as to create sufficient topology change to meaningfully affect the optimization process, without removing so much material that the optimization problem changes drastically (by introducing stress concentrations in narrow features, for example). This center line driven geometric void spacing scheme can improve convergence rates and can provide higher quality results in terms of the final 3D shapes being more similar to how a human would design a part for a 2.5-axis subtractive manufacturing process.

Consider the case where voids extend only one layer into the part. The process begins by computing the "free" surface on a current layer profile 414A by subtracting out areas 416A from layers above as well as preserve geometries which intersect the layer 415A (into which voids should not be added). The shape skeleton 416B of the free surface 414B is then computed, and points along the skeleton which are far enough from the boundary (e.g., the void will maintain a minimum wall thickness) are identified as candidate void locations 416C. Note that the "far enough" measure can be explicitly stated when a minimum feature size constraint is applied, or an explicit value can be requested from the user, or a wall thickness can be estimated as 0.5*(layer height) for 2.5-axis milling and 0.35*(part height) for 2-axis cutting, which can use the same void generation algorithm.

Starting from the candidate points 416C furthest from the free surface boundary 414B, candidate voids 416D are selected so that they are separated from one another by a specified "rib thickness". If a minimum feature size constraint is engaged, the rib thickness can be at least the required minimum thickness. Rib thickness can also be selected as a constant times the wall thickness (e.g., 0.5*wall thickness), as a fraction of the tool size, or as some combination of a minimum feature size, a fraction of the wall thickness, and a fraction of the tool size. In some implementations, the candidate voids 416D are selected in accordance with regular intervals along the shape center line. In some implementations, the candidate voids 416D are successively selected until a specified volume of material (the target void volume for this layer) has been removed or no candidate voids remain. The corresponding voids 416E are then removed from the layer profile and if the volume of voids generated is less than the target volume, the process continues on the next layer down.

In addition, it is desirable to generate voids which are more than one layer deep into the part. In this case, void generation for the current layer begins by attempting to create deeper voids, continuing to shallower ones until the target volume is removed or no candidate voids remain. Generating voids which penetrate deeper into the part is different than single-layer generation in two respects. First, the available surface used not only considers the free surface subtract preserve geometries in the current (top) layer, but also subtracts out preserve geometries in layers below which the void will intersect. This restricted available surface may create a reduced region in which multi-layer voids can be generated. Second, deeper voids may require larger diameters, if dynamic tool sizing is enabled and the hole is deeper than can be reached by the specified minimum tool diameter. These two considerations can result in only a few (or possibly no) voids of a particular depth being generated, and execution proceeds to successively shallower voids until all candidate void points have been selected or discarded (or the target void volume has been reached).

In some implementations, the void generation is split into multiple passes, each of which contributes only part of the total void volume. This distributes the generated voids more broadly across the part instead of forcing them to all lie on the shape skeleton of the initial available surface, which may result in voids being generated in a small region of the available surface when the voids are comparatively small. This is achieved by inserting a smaller number of voids as before in the first pass, then recomputing the shape skeleton of the updated free surface so that it lies between the outer edges of the free surface and the voids placed in the first pass. Subsequent passes can be implemented by iteratively repeating this procedure: generate a few voids, then recomputing the shape skeleton, then generating additional voids, etc. FIG. 4E shows an example of the effect of dividing void generation over multiple passes. In the case of one pass, a profile of available surface 418A is processed as described above to generate all voids 418B in a single pass on the original skeleton. In the case of two passes, some voids 418C (e.g., half of the voids) are generated in the first pass, then a new skeleton is created in the second pass and used to generate the remaining voids 418D.

Table 1 below includes pseudocode for a geometric void generation procedure (with a single attack direction 405).

TABLE 1

```
Given: List of layer profiles profiles, target void volume targetVol
Objective: Place voids in profiles
remainingVol = targetVol
For pass = 1 to 5:
    passTargetVol = remainingVol * 0.4
    passVoidVol = 0.
    For currentLayer in profiles:
        voids = [ ]
        For holeDepth = MAX_DEPTH to 1 step -1:
            bottomLayer = currentLayer.GoDown(holeDepth)
            voidVolume = FindVoids(currentLayer, bottomLayer, passRemainingVol, voids)
            passVoidVol = passVoidVol + voidVolume
            If passVoidVol > passTargetVol:
                Break
            End if
        Next holeDepth
        PlaceVoids(voids)
    Next currentLayer
    remainingVol = remainingVol - passVoidVol
    if remainingVol < 0:
        break
Next pass
```

The FindVoids function uses the shape skeleton to locate voids given a starting and ending layer and a void volume target. Table 2 below shows pseudocode for the FindVoids function. A list of voids to be generated is passed to the function and updated by it; the voids are created in the layer objects as part of PlaceVoids( ) in the pseudocode shown in Table 1.

TABLE 2

```
FindVoids(holeTopLayer, holeBottomLayer, targetVoidVolume, voids)
Given: Top and bottom layer silhouette, desired volume of voids to generate, list of existing proposed voids
Objective: Find voids between the holeTopLayer and holeBottomLayer until no more valid voids can be generated or
the void volume is exceeded.
Return: Void volume used; updates voids list
availableSurface = GetAvailableSurface(holeTopLayer, holeBottomLayer)
skeletonPoints = GetSkeletonPoints(availableSurface)
voidRadius = GetVoidRadius(holeBottomLayer)
voidDepth = holeBottomLayer.depth - holeTopLayer.depth
candidateVoids = [ ]
For skeletonPoint in skeletonPoints:
    If availableSurface.DistanceToBoundary(skeletonPoint) > WALL_BOUNDARY + voidRadius:
        candidateVoids.Append(MakeVoid(skeletonPoint, voidRadius, voidDepth))
    End if
Next skeletonPoint
Sort candidateVoids by availableSurface.DistanceToBoundary( ) descending
voidVolume = 0
voids = [ ]
```

TABLE 2-continued

```
For candidateVoid in candidateVoids:
    If GapBetweenVoids(candidateVoid, voids) > RIB_BOUNDARY:
        voids.Append(candidateVoid)
        voidVolume = voidVolume + candidateVoid.Volume( )
    End if
    If voidVolume > targetVoidVolume:
        Break
    End if
Next candidateVoid
Return voidVolume
```

Table 3 below gives additional details of the GetAvailableSurface( ) function used to compute the region in which voids should be generated. The available surface consists of the top layer's free surface (layer profile Boolean subtract the profile of the layer above), then subtracting the projected preserve regions of each successive layer that the void would intersect so as to ensure that voids are not generated inside of or too close to preserve regions.

TABLE 3

```
GetAvailableSurface(holeTopLayer, holeBottomLayer)
Given: Top and bottom layer silhouette
Objective: Find the "available surface" for void generation between
the specified top and bottom layers
Return: 2D signed distance field of the available surface
availableSurf = holeTopLayer.GetFreeSurface( )
For layerIterator = holeBottomLayer to holeTopLayer:
    availableSurf.BooleanDifference(layerIterator.GetPreserves( ))
Next
availableSurf.RenormalizeSignedDistance( )
Return availableSurf
```

The pseudocode examples above reference several utility functions which are described in Table 4 below.

TABLE 4

| Name | Description |
| --- | --- |
| PlaceVoids(voids) | Subtracts holes described by voids list from the profile of the layer(s) they intersect |
| GapBetweenVoids(queryVoid, voids) | Returns the distance between the query void's boundary and the boundary of the nearest void in the voids list |
| GetVoidRadius(bottomVoidLayer) | Returns the radius a void should be if it extends down to bottomVoidLayer (based on tool size) |
| [Layer].GetFreeSurface( ) | Returns the "free surface" of Layer, which is the layer profile Boolean difference the profile of the layer above (if present) |
| [Layer].GetPreserves( ) | Returns the preserve bodies intersecting Layer as a 2D signed distance field |
| [Layer].GoUp( )/[Layer].GoDown( ) | Returns the layer above/below the current one |
| [2DField].GetSkeletonPoints( ) | Returns a list of points on the interior shape skeleton |
| [2DField].RenormalizeSignedDistance( ) | Renormalize a level set field into a signed distance field |

The description of the various embodiments above focuses on optimizing part shape for a single setup (only one milling direction). But the described implementations can be extended to two or more setups (two or more milling directions). The two or more milling directions can be determined by user input or by automatic detection. Also, the two or more milling directions can include one or more pairs of parallel (coaxial or collinear) milling directions with opposite sign, and/or non-parallel milling directions. In some implementations, the second milling direction is collinear but opposite the first milling direction (i.e., the part is machined, flipped over, and machined again), but the approach described here is applicable to additional, non-collinear milling directions.

The 2.5-axis simulation result and geometry filtering operations can be performed independently for each milling direction, then combined to form the filter output. Each milling direction can have its own set of discrete layers. These discrete layers can be defined in the same manner, i.e., the same number of total layers, and the same thickness(es) of layers (so as to create a pair of coaxial milling directions which operate with geometrically equivalent layer boundary locations), but they are still considered respective sets of discrete layers because the geometry in the layers will typically be different given the different orientations of the 3D shape with respect to each milling direction. Alternatively, the discrete layers can be defined differently for each of one or more of the two or more milling directions, i.e., different numbers layers and different layer thicknesses for the different milling directions.

In the case of simulation result filtering for multiple part setups (multiple milling directions), the simulation result filtering is performed as with the single setup case, but independently for each part setup (for each milling direction). Then the results are merged into a final field to return to the optimizer. The final field ($\psi''$) is composed of the output 3D fields from each setup ($\psi'_i$ for setups 1 . . . m) and the value of the input field $\psi$ according to $$\psi''(x) = \max\left(\psi(x), \min_{i \in [1,m]} \psi'_i\right) \quad (11)$$

This allows the optimizer to see the field value at each voxel at the lowest value encountered in any of the setup directions which intersect it, but never less than the value selected by the solver.

In the case of geometry filtering for multiple part setups (multiple milling directions), the geometry filter is run independently on each setup (for each milling direction). Then a final shape is constructed by combining the results using a Boolean intersection. This emulates the behavior of the milling machine, where tool paths executed on each setup remove different portions of the geometry to produce the final shape.

Thus, the generation 220 of the 2D profiles is performed for each of the two or more milling directions to produce respective sets of 2D profile representations of the updated version of the three dimensional shape, and the extruding 240 is performed for each of the two or more milling directions to produce respective sets of 3D representations having flank faces with normals perpendicular to the respective two or more milling directions. Further, the forming 250 includes performing a Boolean union of the 3D representations in the respective sets of three dimensional representations to produce one or more 3D bodies for each of the two or more milling directions, and performing a Boolean intersection of the 3D bodies produced for the two or more milling directions to form the next version of the three dimensional shape of the modeled object.

Figure 5A:
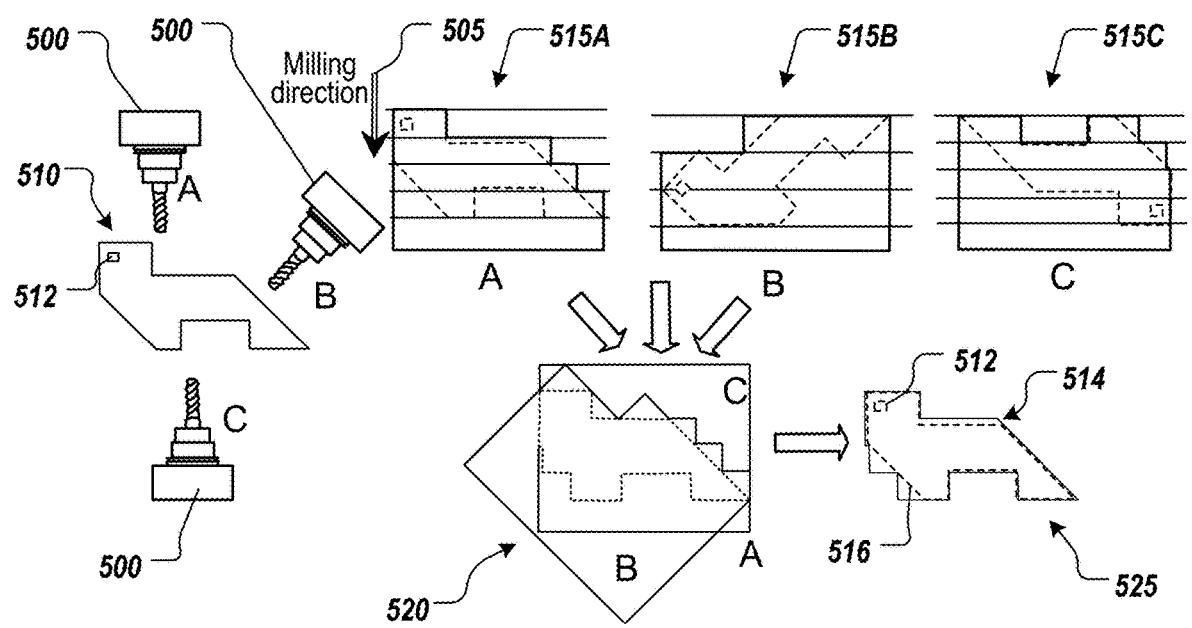
FIG. 5A shows an example of geometry filtering with three milling directions (e.g., three setups).

FIG. 5A shows an example of geometry filtering with three milling directions (e.g., three setups). A machine tool 500 is shown on approach to input geometry 510 from three directions A, B, C (note that milling direction C is antiparallel to milling direction A). Each of these part setup milling directions A, B, C is also shown in relation to a milling direction 505 of the subtractive manufacturing machine, along with the 3D results 515A, 515B, 515C of the regularization filter. Note that this example is focused on the case where the CNC machine is actually a 2.5-axis machine, and so each milling direction corresponds to a different part setup, where the part is manually repositioned and secured in the CNC machine. However, the systems and techniques described can be used with 3-axis and 5-axis CNC machines, and so a given number of milling directions can be effected with fewer than the given number of part setups. In any case, the 3D geometries 515A, 515B, 515C produced by the regularization filter are intersected 520 to produce the final shape 525 (with the original shape 510 overlaid with dashed lines for comparison).

In this example, the input geometry 510 is filtered three times with different layer specifications, one for each setup, and the results are intersected to form the final shape 525.

cally, given 3D level set fields for the geometry regularization results of each setup $\phi'_i$ for i=1 ... m, the final level set function ($\phi''$) is constructed as follows:

$$\phi''(x) = \min_{i \in [1,m]} \phi'i \qquad (12)$$

And note that interpolating between the input and output shape can still be achieved with the expression in Equation (7).

In addition, in some implementations, void generation can be modified in view of multiple available milling directions (e.g., multiple part setups). The stress-driven void generation approach requires no changes to work for multiple setup problems, but for geometric void generation, two undesirable situations should be corrected. First, it is undesirable to have a void generated which intersects a flank edge on a lower layer. Second, it is desirable to only generate voids on surfaces which completely appear in the final part.

Figure 5B:
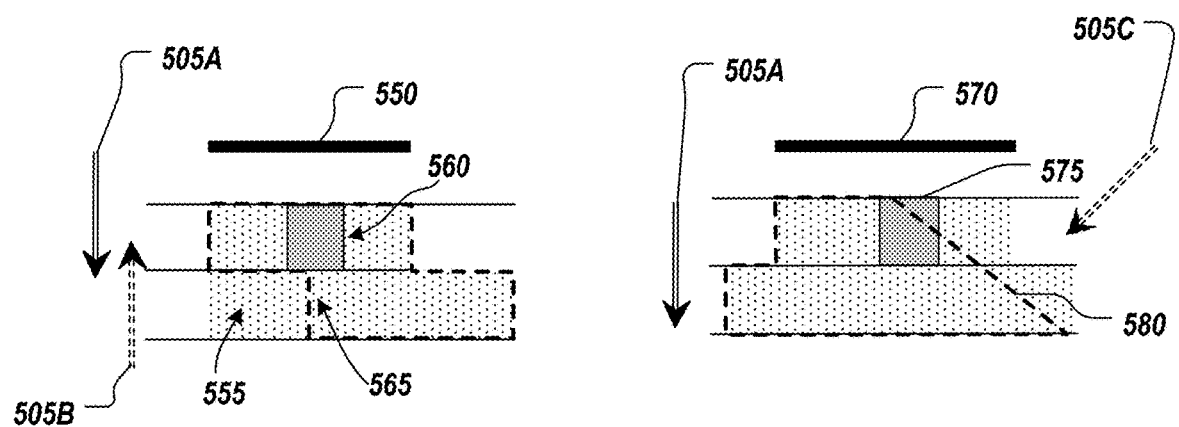
FIG. 5B shows examples of undesirable void locations in the case of multiple milling directions (e.g., multiple setup configurations).

FIG. 5B shows examples of undesirable void locations in the case of multiple milling directions (e.g., multiple setup configurations). For a current milling direction 505A and an available surface cross-section 550, which produces a projection 555 for this setup, a void 560 is undesirable since it intersects a boundary of the final shape 565 on an opposite milling setup for a second milling direction 505B. As another example, for the current milling direction 505A and an available surface cross-section 570, a void 575 is undesirable since it intersects geometry 580 generated by a different milling direction 505C.

To account for these changes, the free surface and available surface definitions are modified. The first defect can be avoided by identifying "corresponding" layers in an antiparallel milling setup and removing a narrow band around the profile boundary from the available surface for each layer the void intersects. Note that blind holes and through holes are still allowed to be created, but holes that land on the profile boundary of any corresponding layer are eliminated. Table 5 below includes pseudocode showing this update to GetAvailableSurface( ) for multiple attack directions (with changes italicized).

TABLE 5

GetAvailableSurface(holeTopLayer, holeBottomLayer)
Given: Top and bottom layer silhouette
Objective: Find the "available surface" for void generation between the specified top and bottom layers
Return: 2D signed distance field of the available surface
availableSurf = holeTopLayer.GetFreeSurface( )
For layerIterator = holeBottomLayer to holeTopLayer:
    *correspondingFreeSurface = layerIterator.GetCorrespondingLayer( ).GetFreeSurface( )*
    *availableSurf.BooleanDifference(correspondingFreeSurface.ConvertToOutline( ))*
    availableSurf.BooleanDifference(layerIterator.GetPreserves( ))
Next
availableSurf.RenormalizeSignedDistance( )
Return availableSurf Note that an internal void 512 is removed (since it is inaccessible from all three setups). The top cutout 514 is slightly mis-aligned due to input geometry that did not line up with the specified layer locations. The diagonal cut 516 on the lower left of the input part 510 cannot be reached by setup B and is approximated with a stair step using setup C instead. The final part is the fully 2.5-axis manufacturable geometry that is closest to the input. Note that the output of the multiple setup filter always completely contains the input shape (only material is added) by construction. Mathemati- The second defect can be remediated by redefining the free surface. Let the Solid Layer Profile be defined with a ray casting operation similar to that used to define the initial layer silhouette, except exclude from the interior points for which the ray was not inside the shape for the bulk of its traversal through the layer. Then, redefine the free surface as the Solid Layer Profile Boolean difference the layer profile of the layer above.

Figure 6:
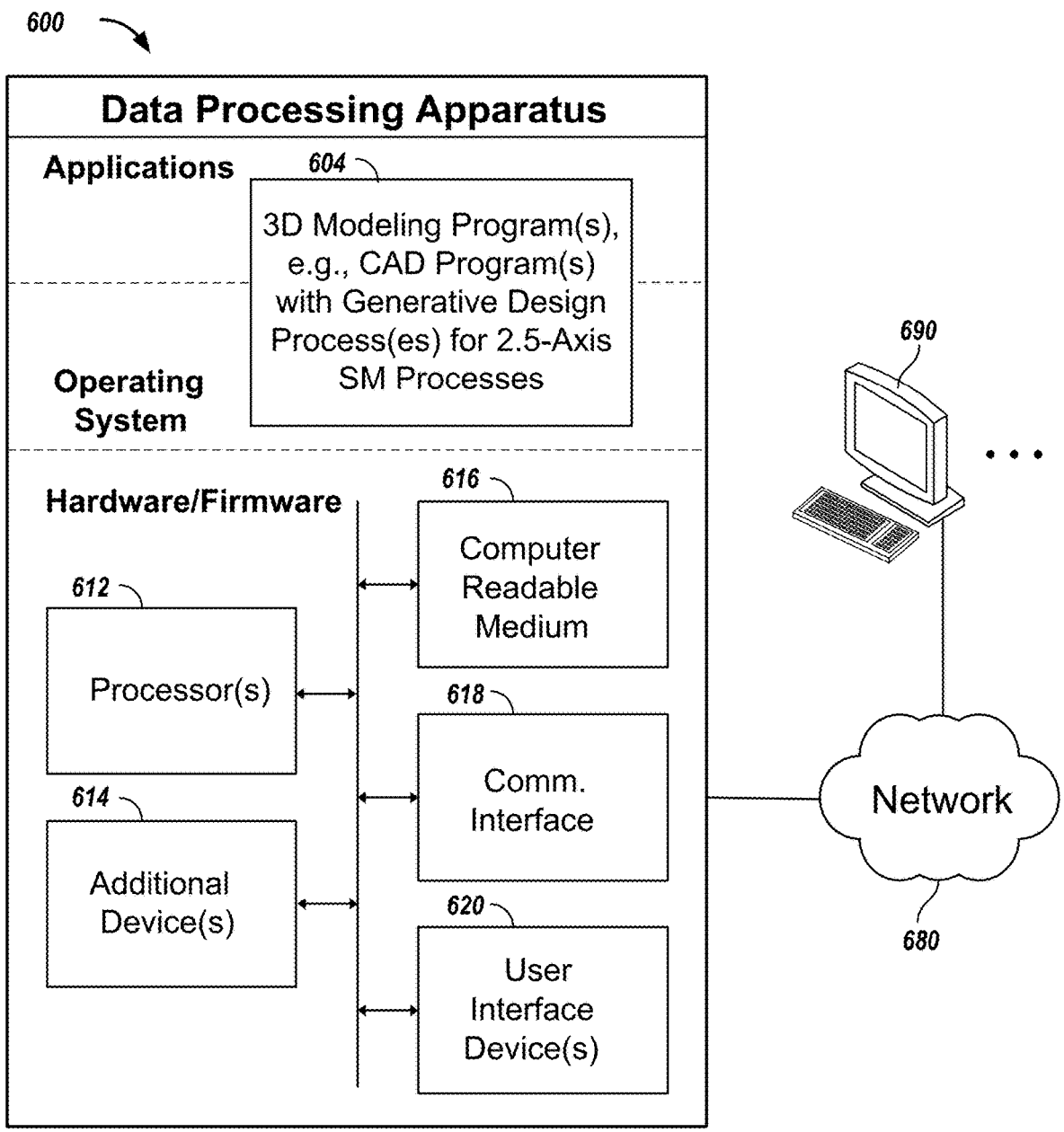
FIG. 6 is a schematic diagram of a data processing system including a data processing apparatus, which can be programmed as a client or as a server.

FIG. 6 is a schematic diagram of a data processing system including a data processing apparatus 600, which can be programmed as a client or as a server. The data processing apparatus 600 is connected with one or more computers 690 through a network 680. While only one computer is shown in FIG. 6 as the data processing apparatus 600, multiple computers can be used. The data processing apparatus 600 includes various software modules, which can be distributed between an applications layer and an operating system. These can include executable and/or interpretable software programs or libraries, including tools and services of one or more 3D modeling programs 604 that implement the systems and techniques described above. Thus, the 3D modeling program(s) 604 can be CAD program(s) 604 (such as CAD program(s) 116) and can implement one or more generative design processes (e.g., using level-set based method(s) for generative design) for topology optimization and physical simulation operations (finite element analysis (FEA) or other) that incorporate geometry filtering, simulation results filtering, layer alignment, and/or void generation and insertion with or without multiple milling directions (e.g., multiple part setups). Further, the program(s) 604 can potentially implement manufacturing control operations (e.g., generating and/or applying toolpath specifications to effect manufacturing of designed objects). The number of software modules used can vary from one implementation to another. Moreover, the software modules can be distributed on one or more data processing apparatus connected by one or more computer networks or other suitable communication networks.

The data processing apparatus 600 also includes hardware or firmware devices including one or more processors 612, one or more additional devices 614, a computer readable medium 616, a communication interface 618, and one or more user interface devices 620. Each processor 612 is capable of processing instructions for execution within the data processing apparatus 600. In some implementations, the processor 612 is a single or multi-threaded processor. Each processor 612 is capable of processing instructions stored on the computer readable medium 616 or on a storage device such as one of the additional devices 614. The data processing apparatus 600 uses the communication interface 618 to communicate with one or more computers 690, for example, over the network 680. Examples of user interface devices 620 include a display, a camera, a speaker, a microphone, a tactile feedback device, a keyboard, a mouse, and VR and/or AR equipment. The data processing apparatus 600 can store instructions that implement operations associated with the program(s) described above, for example, on the computer readable medium 616 or one or more additional devices 614, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, actions recited in the claims can be performed in a different order and still achieve desirable results.

What is claimed is:

1. A method comprising:
obtaining, by a computer aided design program, a design space for a modeled object, for which a corresponding physical structure is to be manufactured using a 2.5-axis subtractive manufacturing process, one or more design criteria for the modeled object, and one or more in-use load cases for the physical structure;
iteratively modifying, by the computer aided design program, a generatively designed three dimensional shape of the modeled object, including modifying both a geometry of the three dimensional shape and a topology of the three dimensional shape, in the design space in accordance with the one or more design criteria and the one or more in-use load cases, wherein the iteratively modifying comprises
performing numerical simulation of the modeled object in accordance with a current version of the three dimensional shape and the one or more in-use load cases to produce a current numerical assessment of a physical response of the modeled object,
updating the current version of the three dimensional shape based on the current numerical assessment of the physical response to produce an updated version of the three dimensional shape of the modeled object,
generating two dimensional profile representations of the updated version of the three dimensional shape, wherein the two dimensional profile representations correspond to discrete layers that are perpendicular to a milling direction of the 2.5-axis subtractive manufacturing process,
extruding the two dimensional profile representations along the milling direction to produce three dimensional representations of the updated version of the three dimensional shape, wherein the three dimensional representations have flank faces with normals perpendicular to the milling direction,
forming a next version of the three dimensional shape of the modeled object from a combination of the three dimensional representations having flank faces with normals perpendicular to the milling direction, and
repeating at least the performing, the updating, the generating, the extruding and the forming until a predefined number of shape modification iterations have been performed, the generatively designed three dimensional shape of the modeled object in the design space satisfies the one or more design criteria and the one or more in-use load cases, or both; and
providing, by the computer aided design program, the generatively designed three dimensional shape of the modeled object for use in manufacturing the physical structure using one or more computer-controlled manufacturing systems that employ the 2.5-axis subtractive manufacturing process.

2. The method of claim 1, wherein the generating comprises generating each of the two dimensional profile representations for a corresponding discrete layer by determining a silhouette of one or more portions of the updated version of the three dimensional shape that lie within both the corresponding discrete layer and any of the discrete layers above the corresponding discrete layer with respect to the milling direction.

3. The method of claim 2, wherein the milling direction comprises two or more milling directions having respective sets of discrete layers, the generating is performed for each of the two or more milling directions to produce respective sets of two dimensional profile representations of the updated version of the three dimensional shape, the extruding is performed for each of the two or more milling directions to produce respective sets of three dimensional representations having flank faces with normals perpendicular to the respective two or more milling directions, and the forming comprises:
  performing a Boolean union of the three dimensional representations in the respective sets of three dimensional representations to produce one or more three dimensional bodies for each of the two or more milling directions; and
  performing a Boolean intersection of the three dimensional bodies produced for the two or more milling directions to form the next version of the three dimensional shape of the modeled object.

4. The method of claim 2, wherein the iteratively modifying comprises producing, for each of multiple iterations, the current version of the three dimensional shape of the modeled object by mixing the next version of the three dimensional shape from a prior iteration with the updated version of the three dimensional shape from the prior iteration, wherein an amount of the next version used in the mixing increases relative to an amount of the updated version, each of two or more subsequent ones of the multiple iterations, until none of the updated version and all of the next version is used as the current version of the three dimensional shape of the modeled object in a next iteration of the modifying.

5. The method of claim 2, wherein the generatively designed three dimensional shape of the modeled object comprises a level-set representation of an implicit surface of the modeled object, and the updating comprises updating the level-set representation in accordance with shape change velocities computed for the implicit surface based on the current numerical assessment of the physical response.

6. The method of claim 5, wherein the iteratively modifying comprises, before the extruding:
  offsetting outward each of the two dimensional profile representations by an amount that is at least equal to a radius of a smallest milling tool available for use with the one or more computer-controlled manufacturing systems; and
  subsequently offsetting inward each of the two dimensional profile representations by the amount.

7. The method of claim 6, comprising setting the amount for offsetting a two dimensional profile representation for one of the discrete layers based on an amount of tool penetration into the physical structure that is needed during the 2.5-axis subtractive manufacturing process to mill the one discrete layer for the two dimensional profile representation.

8. The method of claim 7, wherein generating the two dimensional profile representation for the corresponding discrete layer comprises casting rays along the milling direction through the level-set representation of the implicit surface from the top portion of the upper most discrete layer down to the bottom portion of the corresponding discrete layer, and wherein the setting comprises setting the amount to the maximum of (i) the radius of the smallest milling tool available and (ii) a predefined fraction of the difference, the predefined fraction being greater than zero and less than one.

9. The method of claim 7, comprising:
  comparing the two dimensional profile representations to identify at least a first profile representation above a second profile representation, with respect to the milling direction, wherein a distance between a first portion of the first profile representation and a second portion of the second profile representation is below a threshold distance;
  changing the first portion of the first profile representation to match the second portion of the second profile representation; and
  modifying the first profile representation on either side of the first portion to remove any discontinuities in the first profile representation resulting from the changing.

10. The method of claim 5, wherein modifying the topology of the three dimensional shape comprises inserting voids into the level-set representation at locations selected using a center line generated for at least one of the two dimensional profile representations, to change the implicit surface during at least some of multiple iterations of the iteratively modifying.

11. The method of claim 1, wherein the updating comprises:
  filtering the current numerical assessment in the respective discrete layers to produce a filtered physical assessment that encourages modification of the geometry of the implicit surface of the three dimensional shape consistent with the 2.5-axis subtractive manufacturing process during the updating; and
  updating the current version of the three dimensional shape in accordance with the filtered physical assessment.

12. The method of claim 11, wherein the generatively designed three dimensional shape of the modeled object comprises a level-set representation of the implicit surface, and the filtering comprises:
  finding, within respective ones of the discrete layers, maximum values in the current numerical assessment along the milling direction; and
  resetting values of the current numerical assessment, within the respective ones of the discrete layers, based on the maximum values to produce the filtered physical assessment.

13. The method of claim 12, wherein the current numerical assessment comprises voxel-based stress field data, strain field data or both, wherein the finding comprises casting rays, which are parallel to the milling direction, through the current version of the three dimensional shape of the modeled object, within respective ones of the discrete layers, and collecting in respective two dimensional areas for the discrete layers a maximum value of the stress and/or strain data encountered along each of the rays, and wherein the resetting comprises setting the stress and/or strain data in each voxel, within respective ones of the discrete layers, equal to the maximum value in a location in the discrete layer's corresponding two dimensional area that is closest to the voxel.

14. The method of claim 1, comprising removing, by the computer aided design program, any portions of the generatively designed three dimensional shape of the modeled object that are smaller than a minimum feature size in at least one principal axis of the 2.5-axis subtractive manufacturing process.

15. The method of claim 1, wherein the providing comprises saving the generatively designed three dimensional shape of the modeled object to a permanent storage device for use in manufacturing the physical structure using the one or more computer-controlled manufacturing systems.

16. The method of claim 1, wherein the providing comprises:
generating toolpath specifications for a subtractive manufacturing machine, in accordance with the 2.5-axis subtractive manufacturing process, using the generatively designed three dimensional shape of the modeled object; and
manufacturing at least a portion of the physical structure, or a mold for the physical structure, with the subtractive manufacturing machine using the toolpath specifications.

17. A system comprising:
a non-transitory storage medium having instructions of a computer aided design program stored thereon; and
one or more data processing apparatus configured to run the instructions of the computer aided design program to cause the one or more data processing apparatus to:
obtain a design space for a modeled object, for which a corresponding physical structure is to be manufactured using a 2.5-axis subtractive manufacturing process, one or more design criteria for the modeled object, and one or more in-use load cases for the physical structure,
iteratively modify a generatively designed three dimensional shape of the modeled object, including modifying both a geometry of the three dimensional shape and a topology of the three dimensional shape, in the design space in accordance with the one or more design criteria and the one or more in-use load cases, wherein the iteratively modification comprises the one or more data processing apparatus being caused by the instructions of the computer aided design program to perform numerical simulation of the modeled object in accordance with a current version of the three dimensional shape and the one or more in-use load cases to produce a current numerical assessment of a physical response of the modeled object, update the current version of the three dimensional shape based on the current numerical assessment of the physical response to produce an updated version of the three dimensional shape of the modeled object, generate two dimensional profile representations of the updated version of the three dimensional shape, wherein the two dimensional profile representations correspond to discrete layers that are perpendicular to a milling direction of the 2.5-axis subtractive manufacturing process, extrude the two dimensional profile representations along the milling direction to produce three dimensional representations of the updated version of the three dimensional shape, wherein the three dimensional representations have flank faces with normals perpendicular to the milling direction, form a next version of the three dimensional shape of the modeled object from a combination of the three dimensional representations having flank faces with normals perpendicular to the milling direction, and repeat the iteratively modification until a predefined number of shape modification iterations have been performed, the generatively designed three dimensional shape of the modeled object in the design space satisfies the one or more design criteria and the one or more in-use load cases, or both, and provide the generatively designed three dimensional shape of the modeled object for use in manufacturing the physical structure using one or more computer-controlled manufacturing systems that employ the 2.5-axis subtractive manufacturing process.

18. The system of claim 17, comprising a computer numerically controlled subtractive manufacturing milling machine.

19. A non-transitory computer-readable medium encoding a computer aided design program operable to cause one or more data processing apparatus to perform operations comprising:
obtaining a design space for a modeled object, for which a corresponding physical structure is to be manufactured using a 2.5-axis subtractive manufacturing process, one or more design criteria for the modeled object, and one or more in-use load cases for the physical structure;
iteratively modifying a generatively designed three dimensional shape of the modeled object, including modifying both a geometry of the three dimensional shape and a topology of the three dimensional shape, in the design space in accordance with the one or more design criteria and the one or more in-use load cases, wherein the iteratively modifying comprises
performing numerical simulation of the modeled object in accordance with a current version of the three dimensional shape and the one or more in-use load cases to produce a current numerical assessment of a physical response of the modeled object,
updating the current version of the three dimensional shape based on the current numerical assessment of the physical response to produce an updated version of the three dimensional shape of the modeled object,
generating two dimensional profile representations of the updated version of the three dimensional shape, wherein the two dimensional profile representations correspond to discrete layers that are perpendicular to a milling direction of the 2.5-axis subtractive manufacturing process,
extruding the two dimensional profile representations along the milling direction to produce three dimensional representations of the updated version of the three dimensional shape, wherein the three dimensional representations have flank faces with normals perpendicular to the milling direction,
forming a next version of the three dimensional shape of the modeled object from a combination of the three dimensional representations having flank faces with normals perpendicular to the milling direction, and
repeating at least the performing, the updating, the generating, the extruding and the forming until a predefined number of shape modification iterations have been performed, the generatively designed three dimensional shape of the modeled object in the design space satisfies the one or more design criteria and the one or more in-use load cases, or both; and
providing the generatively designed three dimensional shape of the modeled object for use in manufacturing the physical structure using one or more computer-controlled manufacturing systems that employ the 2.5-axis subtractive manufacturing process.

20. The non-transitory computer-readable medium of claim 19, wherein the providing comprises:
- generating toolpath specifications for a subtractive manufacturing machine, in accordance with the 2.5-axis subtractive manufacturing process, using the generatively designed three dimensional shape of the modeled object; and
- manufacturing at least a portion of the physical structure, or a mold for the physical structure, with the subtractive manufacturing machine using the toolpath specifications.

* * * * *